(12) United States Patent
Kennewick, Jr. et al.

(10) Patent No.: US 10,229,673 B2
(45) Date of Patent: *Mar. 12, 2019

(54) SYSTEM AND METHOD FOR PROVIDING FOLLOW-UP RESPONSES TO PRIOR NATURAL LANGUAGE INPUTS OF A USER

(71) Applicant: VoiceBox Technologies Corporation, Bellevue, WA (US)

(72) Inventors: Michael R. Kennewick, Jr., Bellevue, WA (US); Michael R. Kennewick, Sr., Bellevue, WA (US)

(73) Assignee: VOICEBOX TECHNOLOGIES CORPORATION, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,246

(22) Filed: Aug. 18, 2017

(65) Prior Publication Data

US 2017/0345417 A1 Nov. 30, 2017

Related U.S. Application Data

(63) Continuation of application No. 14/884,030, filed on Oct. 15, 2015, now Pat. No. 9,747,896.

(Continued)

(51) Int. Cl.
*G10L 15/18* (2013.01)
*G06F 17/28* (2006.01)
*G06F 17/30* (2006.01)

(52) U.S. Cl.
CPC .............. *G10L 15/18* (2013.01); *G06F 17/28* (2013.01); *G06F 17/30654* (2013.01)

(58) Field of Classification Search
CPC ...................................................... G10L 15/08

(Continued)

(56) References Cited

U.S. PATENT DOCUMENTS 4,430,669 A 2/1984 Cheung
4,821,027 A 4/1989 Mallory
(Continued)

FOREIGN PATENT DOCUMENTS

CN 1433554 A 7/2003
CN 1860496 A 11/2006
(Continued)

OTHER PUBLICATIONS

"Statement in Accordance with the Notice from the European Patent Office" dated Oct. 1, 2007 Concerning Business Methods (OJ EPO Nov. 2007, 592-593), XP002456252.
(Continued)

*Primary Examiner* — Shaun Roberts
(74) *Attorney, Agent, or Firm* — Ohlandt, Greeley, Ruggiero & Perle, L.L.P.

(57) ABSTRACT

In certain implementations, follow-up responses may be provided for prior natural language inputs of a user. As an example, a natural language input associated with a user may be received at a computer system. A determination of whether information sufficient for providing an adequate response to the natural language input is currently accessible to the computer system may be effectuated. A first response to the natural language input (that indicates that a follow-up response will be provided) may be provided based on a determination that information sufficient for providing an adequate response to the natural language input is not currently accessible. Information sufficient for providing an adequate response to the natural language input may be received. A second response to the natural language input may then be provided based on the received sufficient information.

22 Claims, 7 Drawing Sheets

Related U.S. Application Data

(60) Provisional application No. 62/064,329, filed on Oct. 15, 2014.

(58) Field of Classification Search
USPC .......................................... 704/257, 270, 275
See application file for complete search history.

(56) References Cited

U.S. PATENT DOCUMENTS

| | | |
|---|---|---|
| 4,829,423 A | 5/1989 | Tennant |
| 4,887,212 A | 12/1989 | Zamora |
| 4,910,784 A | 3/1990 | Doddington |
| 5,027,406 A | 6/1991 | Roberts |
| 5,155,743 A | 10/1992 | Jacobs |
| 5,164,904 A | 11/1992 | Sumner |
| 5,208,748 A | 5/1993 | Flores |
| 5,265,065 A | 11/1993 | Turtle |
| 5,274,560 A | 12/1993 | LaRue |
| 5,331,554 A | 7/1994 | Graham |
| 5,357,596 A | 10/1994 | Takebayashi |
| 5,369,575 A | 11/1994 | Lamberti |
| 5,377,350 A | 12/1994 | Skinner |
| 5,386,556 A | 1/1995 | Hedin |
| 5,424,947 A | 6/1995 | Nagao |
| 5,471,318 A | 11/1995 | Ahuja |
| 5,475,733 A | 12/1995 | Eisdorfer |
| 5,479,563 A | 12/1995 | Yamaguchi |
| 5,488,652 A | 1/1996 | Bielby |
| 5,499,289 A | 3/1996 | Bruno |
| 5,500,920 A | 3/1996 | Kupiec |
| 5,517,560 A | 5/1996 | Greenspan |
| 5,533,108 A | 7/1996 | Harris |
| 5,537,436 A | 7/1996 | Bottoms |
| 5,539,744 A | 7/1996 | Chu |
| 5,557,667 A | 9/1996 | Bruno |
| 5,559,864 A | 9/1996 | Kennedy, Jr. |
| 5,563,937 A | 10/1996 | Bruno |
| 5,577,165 A | 11/1996 | Takebayashi |
| 5,590,039 A | 12/1996 | Ikeda |
| 5,608,635 A | 3/1997 | Tamai |
| 5,615,296 A | 3/1997 | Stanford |
| 5,617,407 A | 4/1997 | Bareis |
| 5,633,922 A | 5/1997 | August |
| 5,634,086 A | 5/1997 | Rtischev |
| 5,652,570 A | 7/1997 | Lepkofker |
| 5,675,629 A | 10/1997 | Raffel |
| 5,696,965 A | 12/1997 | Dedrick |
| 5,708,422 A | 1/1998 | Blonder |
| 5,721,938 A | 2/1998 | Stuckey |
| 5,722,084 A | 2/1998 | Chakrin |
| 5,740,256 A | 4/1998 | CastelloDaCosta |
| 5,742,763 A | 4/1998 | Jones |
| 5,748,841 A | 5/1998 | Morin |
| 5,748,974 A | 5/1998 | Johnson |
| 5,752,052 A | 5/1998 | Richardson |
| 5,754,784 A | 5/1998 | Garland |
| 5,761,631 A | 6/1998 | Nasukawa |
| 5,774,841 A | 6/1998 | Salazar |
| 5,774,859 A | 6/1998 | Houser |
| 5,794,050 A | 8/1998 | Dahlgren |
| 5,794,196 A | 8/1998 | Yegnanarayanan |
| 5,797,112 A | 8/1998 | Komatsu |
| 5,799,276 A | 8/1998 | Komissarchik |
| 5,802,510 A | 9/1998 | Jones |
| 5,829,000 A | 10/1998 | Huang |
| 5,832,221 A | 11/1998 | Jones |
| 5,839,107 A | 11/1998 | Gupta |
| 5,848,396 A | 12/1998 | Gerace |
| 5,855,000 A | 12/1998 | Waibel |
| 5,867,817 A | 2/1999 | Catallo |
| 5,878,385 A | 3/1999 | Bralich |
| 5,878,386 A | 3/1999 | Coughlin |
| 5,892,813 A | 4/1999 | Morin |
| 5,892,900 A | 4/1999 | Ginter |
| 5,895,464 A | 4/1999 | Bhandari |
| 5,895,466 A | 4/1999 | Goldberg |
| 5,897,613 A | 4/1999 | Chan |
| 5,899,991 A | 5/1999 | Karch |
| 5,902,347 A | 5/1999 | Backman |
| 5,911,120 A | 6/1999 | Jarett |
| 5,918,222 A | 6/1999 | Fukui |
| 5,926,784 A | 7/1999 | Richardson |
| 5,933,822 A | 8/1999 | Braden-Harder |
| 5,950,167 A | 9/1999 | Yaker |
| 5,953,393 A | 9/1999 | Culbreth |
| 5,960,384 A | 9/1999 | Brash |
| 5,960,397 A | 9/1999 | Rahim |
| 5,960,399 A | 9/1999 | Barclay |
| 5,960,447 A | 9/1999 | Holt |
| 5,963,894 A | 10/1999 | Richardson |
| 5,963,940 A | 10/1999 | Liddy |
| 5,983,190 A | 11/1999 | Trower |
| 5,987,404 A | 11/1999 | DellaPietra |
| 5,991,721 A | 11/1999 | Asano |
| 5,995,119 A | 11/1999 | Cosatto |
| 5,995,928 A | 11/1999 | Nguyen |
| 5,995,943 A | 11/1999 | Bull |
| 6,009,382 A | 12/1999 | Martino |
| 6,014,559 A | 1/2000 | Amin |
| 6,018,708 A | 1/2000 | Dahan |
| 6,021,384 A | 2/2000 | Gorin |
| 6,028,514 A | 2/2000 | Lemelson |
| 6,035,267 A | 3/2000 | Watanabe |
| 6,044,347 A | 3/2000 | Abella |
| 6,049,602 A | 4/2000 | Foladare |
| 6,049,607 A | 4/2000 | Marash |
| 6,058,187 A | 5/2000 | Chen |
| 6,067,513 A | 5/2000 | Ishimitsu |
| 6,073,098 A | 6/2000 | Buchsbaum |
| 6,076,059 A | 6/2000 | Glickman |
| 6,078,886 A | 6/2000 | Dragosh |
| 6,081,774 A | 6/2000 | deHita |
| 6,085,186 A | 7/2000 | Christianson |
| 6,101,241 A | 8/2000 | Boyce |
| 6,108,631 A | 8/2000 | Ruhl |
| 6,119,087 A | 9/2000 | Kuhn |
| 6,119,101 A | 9/2000 | Peckover |
| 6,122,613 A | 9/2000 | Baker |
| 6,134,235 A | 10/2000 | Goldman |
| 6,144,667 A | 11/2000 | Doshi |
| 6,144,938 A | 11/2000 | Surace |
| 6,154,526 A | 11/2000 | Dahlke |
| 6,160,883 A | 12/2000 | Jackson |
| 6,167,377 A | 12/2000 | Gillick |
| 6,173,266 B1 | 1/2001 | Marx |
| 6,173,279 B1 | 1/2001 | Levin |
| 6,175,858 B1 | 1/2001 | Bulfer |
| 6,185,535 B1 | 2/2001 | Hedin |
| 6,188,982 B1 | 2/2001 | Chiang |
| 6,192,110 B1 | 2/2001 | Abella |
| 6,192,338 B1 | 2/2001 | Haszto |
| 6,195,634 B1 | 2/2001 | Dudemaine |
| 6,195,651 B1 | 2/2001 | Handel |
| 6,199,043 B1 | 3/2001 | Happ |
| 6,208,964 B1 | 3/2001 | Sabourin |
| 6,208,972 B1 | 3/2001 | Grant |
| 6,219,346 B1 | 4/2001 | Maxemchuk |
| 6,219,643 B1 | 4/2001 | Cohen |
| 6,219,645 B1 | 4/2001 | Byers |
| 6,226,612 B1 | 5/2001 | Srenger |
| 6,233,556 B1 | 5/2001 | Teunen |
| 6,233,559 B1 | 5/2001 | Balakrishnan |
| 6,233,561 B1 | 5/2001 | Junqua |
| 6,236,968 B1 | 5/2001 | Kanevsky |
| 6,243,679 B1 | 6/2001 | Mohri |
| 6,246,981 B1 | 6/2001 | Papineni |
| 6,246,990 B1 | 6/2001 | Happ |
| 6,266,636 B1 | 7/2001 | Kosaka |
| 6,269,336 B1 | 7/2001 | Ladd |
| 6,272,455 B1 | 8/2001 | Hoshen |
| 6,272,461 B1 | 8/2001 | Meredith |
| 6,275,231 B1 | 8/2001 | Obradovich |
| 6,278,377 B1 | 8/2001 | DeLine |
| 6,278,968 B1 | 8/2001 | Franz |

(56) References Cited

U.S. PATENT DOCUMENTS

| | | | |
|---|---|---|---|
| 6,286,002 | B1 | 9/2001 | Axaopoulos |
| 6,288,319 | B1 | 9/2001 | Catona |
| 6,292,767 | B1 | 9/2001 | Jackson |
| 6,301,560 | B1 | 10/2001 | Masters |
| 6,308,151 | B1 | 10/2001 | Smith |
| 6,311,159 | B1 | 10/2001 | VanTichelen |
| 6,314,402 | B1 | 11/2001 | Monaco |
| 6,321,196 | B1 | 11/2001 | Franceschi |
| 6,356,869 | B1 | 3/2002 | Chapados |
| 6,362,748 | B1 | 3/2002 | Huang |
| 6,366,882 | B1 | 4/2002 | Bijl |
| 6,366,886 | B1 | 4/2002 | Dragosh |
| 6,374,214 | B1 | 4/2002 | Friedland |
| 6,374,226 | B1 | 4/2002 | Hunt |
| 6,377,913 | B1 | 4/2002 | Coffman |
| 6,381,535 | B1 | 4/2002 | Durocher |
| 6,385,596 | B1 | 5/2002 | Wiser |
| 6,385,646 | B1 | 5/2002 | Brown |
| 6,389,398 | B1 | 5/2002 | Lustgarten |
| 6,393,403 | B1 | 5/2002 | Majaniemi |
| 6,393,428 | B1 | 5/2002 | Miller |
| 6,397,181 | B1 | 5/2002 | Li |
| 6,404,878 | B1 | 6/2002 | Jackson |
| 6,405,170 | B1 | 6/2002 | Phillips |
| 6,408,272 | B1 | 6/2002 | White |
| 6,411,810 | B1 | 6/2002 | Maxemchuk |
| 6,411,893 | B2 | 6/2002 | Ruhl |
| 6,415,257 | B1 | 7/2002 | Junqua |
| 6,418,210 | B1 | 7/2002 | Sayko |
| 6,420,975 | B1 | 7/2002 | DeLine |
| 6,429,813 | B2 | 8/2002 | Feigen |
| 6,430,285 | B1 | 8/2002 | Bauer |
| 6,430,531 | B1 | 8/2002 | Polish |
| 6,434,523 | B1 | 8/2002 | Monaco |
| 6,434,524 | B1 | 8/2002 | Weber |
| 6,434,529 | B1 | 8/2002 | Walker |
| 6,442,522 | B1 | 8/2002 | Carberry |
| 6,446,114 | B1 | 9/2002 | Bulfer |
| 6,453,153 | B1 | 9/2002 | Bowker |
| 6,453,292 | B2 | 9/2002 | Ramaswamy |
| 6,456,711 | B1 | 9/2002 | Cheung |
| 6,456,974 | B1 | 9/2002 | Baker |
| 6,466,654 | B1 | 10/2002 | Cooper |
| 6,466,899 | B1 | 10/2002 | Yano |
| 6,470,315 | B1 | 10/2002 | Netsch |
| 6,487,494 | B2 | 11/2002 | Odinak |
| 6,487,495 | B1 | 11/2002 | Gale |
| 6,498,797 | B1 | 12/2002 | Anerousis |
| 6,499,013 | B1 | 12/2002 | Weber |
| 6,501,833 | B2 | 12/2002 | Phillips |
| 6,501,834 | B1 | 12/2002 | Milewski |
| 6,505,155 | B1 | 1/2003 | Vanbuskirk |
| 6,510,417 | B1 | 1/2003 | Woods |
| 6,513,006 | B2 | 1/2003 | Howard |
| 6,522,746 | B1 | 2/2003 | Marchok |
| 6,523,061 | B1 | 2/2003 | Halverson |
| 6,532,444 | B1 | 3/2003 | Weber |
| 6,539,348 | B1 | 3/2003 | Bond |
| 6,549,629 | B2 | 4/2003 | Finn |
| 6,553,372 | B1 | 4/2003 | Brassell |
| 6,556,970 | B1 | 4/2003 | Sasaki |
| 6,556,973 | B1 | 4/2003 | Lewin |
| 6,560,576 | B1 | 5/2003 | Cohen |
| 6,560,590 | B1 | 5/2003 | Shwe |
| 6,567,778 | B1 | 5/2003 | ChaoChang |
| 6,567,797 | B1 | 5/2003 | Schuetze |
| 6,567,805 | B1 | 5/2003 | Johnson |
| 6,570,555 | B1 | 5/2003 | Prevost |
| 6,570,964 | B1 | 5/2003 | Murveit |
| 6,571,279 | B1 | 5/2003 | Herz |
| 6,574,597 | B1 | 6/2003 | Mohri |
| 6,574,624 | B1 | 6/2003 | Johnson |
| 6,578,022 | B1 | 6/2003 | Foulger |
| 6,581,103 | B1 | 6/2003 | Dengler |
| 6,584,439 | B1 | 6/2003 | Geilhufe |
| 6,587,858 | B1 | 7/2003 | Strazza |
| 6,591,185 | B1 | 7/2003 | Polidi |
| 6,591,239 | B1 | 7/2003 | McCall |
| 6,594,257 | B1 | 7/2003 | Doshi |
| 6,594,367 | B1 | 7/2003 | Marash |
| 6,598,018 | B1 | 7/2003 | Junqua |
| 6,601,026 | B2 | 7/2003 | Appelt |
| 6,601,029 | B1 | 7/2003 | Pickering |
| 6,604,075 | B1 | 8/2003 | Brown |
| 6,604,077 | B2 | 8/2003 | Dragosh |
| 6,606,598 | B1 | 8/2003 | Holthouse |
| 6,611,692 | B2 | 8/2003 | Raffel |
| 6,614,773 | B1 | 9/2003 | Maxemchuk |
| 6,615,172 | B1 | 9/2003 | Bennett |
| 6,622,119 | B1 | 9/2003 | Ramaswamy |
| 6,629,066 | B1 | 9/2003 | Jackson |
| 6,631,346 | B1 | 10/2003 | Karaorman |
| 6,631,351 | B1 | 10/2003 | Ramachandran |
| 6,633,846 | B1 | 10/2003 | Bennett |
| 6,636,790 | B1 | 10/2003 | Lightner |
| 6,643,620 | B1 | 11/2003 | Contolini |
| 6,647,363 | B2 | 11/2003 | Claassen |
| 6,650,747 | B1 | 11/2003 | Bala |
| 6,658,388 | B1 | 12/2003 | Kleindienst |
| 6,678,680 | B1 | 1/2004 | Woo |
| 6,681,206 | B1 | 1/2004 | Gorin |
| 6,691,151 | B1 | 2/2004 | Cheyer |
| 6,701,294 | B1 | 3/2004 | Ball |
| 6,704,396 | B2 | 3/2004 | Parolkar |
| 6,704,576 | B1 | 3/2004 | Brachman |
| 6,704,708 | B1 | 3/2004 | Pickering |
| 6,707,421 | B1 | 3/2004 | Drury |
| 6,708,150 | B1 | 3/2004 | Hirayama |
| 6,721,001 | B1 | 4/2004 | Berstis |
| 6,721,633 | B2 | 4/2004 | Funk |
| 6,721,706 | B1 | 4/2004 | Strubbe |
| 6,726,636 | B2 | 4/2004 | DerGhazarian |
| 6,732,088 | B1 | 5/2004 | Glance |
| 6,735,592 | B1 | 5/2004 | Neumann |
| 6,739,556 | B1 | 5/2004 | Langston |
| 6,741,931 | B1 | 5/2004 | Kohut |
| 6,742,021 | B1 | 5/2004 | Halverson |
| 6,745,161 | B1 | 6/2004 | Arnold |
| 6,751,591 | B1 | 6/2004 | Gorin |
| 6,751,612 | B1 | 6/2004 | Schuetze |
| 6,754,485 | B1 | 6/2004 | Obradovich |
| 6,754,627 | B2 | 6/2004 | Woodward |
| 6,754,647 | B1 | 6/2004 | Tackett |
| 6,757,544 | B2 | 6/2004 | Rangarajan |
| 6,757,718 | B1 | 6/2004 | Halverson |
| 6,785,651 | B1 | 8/2004 | Wang |
| 6,795,808 | B1 | 9/2004 | Strubbe |
| 6,801,604 | B2 | 10/2004 | Maes |
| 6,801,893 | B1 | 10/2004 | Backfried |
| 6,804,330 | B1 | 10/2004 | Jones |
| 6,810,375 | B1 | 10/2004 | Ejerhed |
| 6,813,341 | B1 | 11/2004 | Mahoney |
| 6,816,830 | B1 | 11/2004 | Kempe |
| 6,829,603 | B1 | 12/2004 | Chai |
| 6,832,230 | B1 | 12/2004 | Zilliacus |
| 6,833,848 | B1 | 12/2004 | Wolff |
| 6,850,603 | B1 | 2/2005 | Eberle |
| 6,856,990 | B2 | 2/2005 | Barile |
| 6,865,481 | B2 | 3/2005 | Kawazoe |
| 6,868,380 | B2 | 3/2005 | Kroeker |
| 6,868,385 | B1 | 3/2005 | Gerson |
| 6,871,179 | B1 | 3/2005 | Kist |
| 6,873,837 | B1 | 3/2005 | Yoshioka |
| 6,877,001 | B2 | 4/2005 | Wolf |
| 6,877,134 | B1 | 4/2005 | Fuller |
| 6,882,970 | B1 | 4/2005 | Garner |
| 6,901,366 | B1 | 5/2005 | Kuhn |
| 6,910,003 | B1 | 6/2005 | Arnold |
| 6,912,498 | B2 | 6/2005 | Stevens |
| 6,915,126 | B2 | 7/2005 | Mazzara, Jr. |
| 6,928,614 | B1 | 8/2005 | Everhart |
| 6,934,756 | B2 | 8/2005 | Maes |
| 6,937,977 | B2 | 8/2005 | Gerson |
| 6,937,982 | B2 | 8/2005 | Kitaoka |

(56) References Cited

U.S. PATENT DOCUMENTS

| | | | |
|---|---|---|---|
| 6,941,266 | B1 | 9/2005 | Gorin |
| 6,944,594 | B2 | 9/2005 | Busayapongchai |
| 6,950,821 | B2 | 9/2005 | Faybishenko |
| 6,954,755 | B2 | 10/2005 | Reisman |
| 6,959,276 | B2 | 10/2005 | Droppo |
| 6,961,700 | B2 | 11/2005 | Mitchell |
| 6,963,759 | B1 | 11/2005 | Gerson |
| 6,964,023 | B2 | 11/2005 | Maes |
| 6,968,311 | B2 | 11/2005 | Knockeart |
| 6,973,387 | B2 | 12/2005 | Masclet |
| 6,975,993 | B1 | 12/2005 | Keiller |
| 6,980,092 | B2 | 12/2005 | Turnbull |
| 6,983,055 | B2 | 1/2006 | Luo |
| 6,990,513 | B2 | 1/2006 | Belfiore |
| 6,996,531 | B2 | 2/2006 | Korall |
| 7,003,463 | B1 | 2/2006 | Maes |
| 7,016,849 | B2 | 3/2006 | Arnold |
| 7,020,609 | B2 | 3/2006 | Thrift |
| 7,024,364 | B2 | 4/2006 | Guerra |
| 7,027,586 | B2 | 4/2006 | Bushey |
| 7,027,974 | B1 | 4/2006 | Busch |
| 7,027,975 | B1 | 4/2006 | Pazandak |
| 7,035,415 | B2 | 4/2006 | Belt |
| 7,036,128 | B1 | 4/2006 | Julia |
| 7,043,425 | B2 | 5/2006 | Pao |
| 7,054,817 | B2 | 5/2006 | Shao |
| 7,058,890 | B2 | 6/2006 | George |
| 7,062,488 | B1 | 6/2006 | Reisman |
| 7,069,220 | B2 | 6/2006 | Coffman |
| 7,072,834 | B2 | 7/2006 | Zhou |
| 7,072,888 | B1 | 7/2006 | Perkins |
| 7,076,362 | B2 | 7/2006 | Ohtsuji |
| 7,082,469 | B2 | 7/2006 | Gold |
| 7,085,708 | B2 | 8/2006 | Manson |
| 7,092,928 | B1 | 8/2006 | Elad |
| 7,107,210 | B2 | 9/2006 | Deng |
| 7,107,218 | B1 | 9/2006 | Preston |
| 7,110,951 | B1 | 9/2006 | Lemelson |
| 7,127,395 | B1 | 10/2006 | Gorin |
| 7,127,400 | B2 | 10/2006 | Koch |
| 7,130,390 | B2 | 10/2006 | Abburi |
| 7,136,875 | B2 | 11/2006 | Anderson |
| 7,137,126 | B1 | 11/2006 | Coffman |
| 7,143,037 | B1 | 11/2006 | Chestnut |
| 7,143,039 | B1 | 11/2006 | Stifelman |
| 7,146,319 | B2 | 12/2006 | Hunt |
| 7,149,696 | B2 | 12/2006 | Shimizu |
| 7,165,028 | B2 | 1/2007 | Gong |
| 7,170,993 | B2 | 1/2007 | Anderson |
| 7,171,291 | B2 | 1/2007 | Obradovich |
| 7,174,300 | B2 | 2/2007 | Bush |
| 7,177,798 | B2 | 2/2007 | Hsu |
| 7,184,957 | B2 | 2/2007 | Brookes |
| 7,190,770 | B2 | 3/2007 | Ando |
| 7,197,069 | B2 | 3/2007 | Agazzi |
| 7,197,460 | B1 | 3/2007 | Gupta |
| 7,203,644 | B2 | 4/2007 | Anderson |
| 7,206,418 | B2 | 4/2007 | Yang |
| 7,207,011 | B2 | 4/2007 | Mulvey |
| 7,215,941 | B2 | 5/2007 | Beckmann |
| 7,228,276 | B2 | 6/2007 | Omote |
| 7,231,343 | B1 | 6/2007 | Treadgold |
| 7,236,923 | B1 | 6/2007 | Gupta |
| 7,254,482 | B2 | 8/2007 | Kawasaki |
| 7,272,212 | B2 | 9/2007 | Eberle |
| 7,277,854 | B2 | 10/2007 | Bennett |
| 7,283,829 | B2 | 10/2007 | Christenson |
| 7,283,951 | B2 | 10/2007 | Marchisio |
| 7,289,606 | B2 | 10/2007 | Sibal |
| 7,299,186 | B2 | 11/2007 | Kuzunuki |
| 7,301,093 | B2 | 11/2007 | Sater |
| 7,305,381 | B1 | 12/2007 | Poppink |
| 7,321,850 | B2 | 1/2008 | Wakita |
| 7,328,155 | B2 | 2/2008 | Endo |
| 7,337,116 | B2 | 2/2008 | Charlesworth |
| 7,340,040 | B1 | 3/2008 | Saylor |
| 7,366,285 | B2 | 4/2008 | Parolkar |
| 7,366,669 | B2 | 4/2008 | Nishitani |
| 7,376,645 | B2 | 5/2008 | Bernard |
| 7,386,443 | B1 | 6/2008 | Parthasarathy |
| 7,398,209 | B2 | 7/2008 | Kennewick |
| 7,406,421 | B2 | 7/2008 | Odinak |
| 7,415,100 | B2 | 8/2008 | Cooper |
| 7,415,414 | B2 | 8/2008 | Azara |
| 7,421,393 | B1 | 9/2008 | DiFabbrizio |
| 7,424,431 | B2 | 9/2008 | Greene |
| 7,447,635 | B1 | 11/2008 | Konopka |
| 7,451,088 | B1 | 11/2008 | Ehlen |
| 7,454,368 | B2 | 11/2008 | Stillman |
| 7,454,608 | B2 | 11/2008 | Gopalakrishnan |
| 7,461,059 | B2 | 12/2008 | Richardson |
| 7,472,020 | B2 | 12/2008 | Brulle-Drews |
| 7,472,060 | B1 | 12/2008 | Gorin |
| 7,472,075 | B2 | 12/2008 | Odinak |
| 7,477,909 | B2 | 1/2009 | Roth |
| 7,478,036 | B2 | 1/2009 | Shen |
| 7,487,088 | B1 | 2/2009 | Gorin |
| 7,487,110 | B2 | 2/2009 | Bennett |
| 7,493,259 | B2 | 2/2009 | Jones |
| 7,493,559 | B1 | 2/2009 | Wolff |
| 7,502,672 | B1 | 3/2009 | Kolls |
| 7,502,738 | B2 | 3/2009 | Kennewick |
| 7,516,076 | B2 | 4/2009 | Walker |
| 7,529,675 | B2 | 5/2009 | Maes |
| 7,536,297 | B2 | 5/2009 | Byrd |
| 7,536,374 | B2 | 5/2009 | Au |
| 7,542,894 | B2 | 6/2009 | Murata |
| 7,546,382 | B2 | 6/2009 | Healey |
| 7,548,491 | B2 | 6/2009 | Macfarlane |
| 7,552,054 | B1 | 6/2009 | Stifelman |
| 7,558,730 | B2 | 7/2009 | Davis |
| 7,574,362 | B2 | 8/2009 | Walker |
| 7,577,244 | B2 | 8/2009 | Taschereau |
| 7,606,708 | B2 | 10/2009 | Hwang |
| 7,606,712 | B1 | 10/2009 | Smith |
| 7,620,549 | B2 | 11/2009 | DiCristo |
| 7,634,409 | B2 | 12/2009 | Kennewick |
| 7,640,006 | B2 | 12/2009 | Portman |
| 7,640,160 | B2 | 12/2009 | DiCristo |
| 7,640,272 | B2 | 12/2009 | Mahajan |
| 7,672,931 | B2 | 3/2010 | Hurst-Hiller |
| 7,676,365 | B2 | 3/2010 | Hwang |
| 7,676,369 | B2 | 3/2010 | Fujimoto |
| 7,684,977 | B2 | 3/2010 | Morikawa |
| 7,693,720 | B2 | 4/2010 | Kennewick |
| 7,697,673 | B2 | 4/2010 | Chiu |
| 7,706,616 | B2 | 4/2010 | Kristensson |
| 7,729,916 | B2 | 6/2010 | Coffman |
| 7,729,918 | B2 | 6/2010 | Walker |
| 7,729,920 | B2 | 6/2010 | Chaar |
| 7,734,287 | B2 | 6/2010 | Ying |
| 7,748,021 | B2 | 6/2010 | Obradovich |
| 7,788,084 | B2 | 8/2010 | Brun |
| 7,792,257 | B1 | 9/2010 | Vanier |
| 7,801,731 | B2 | 9/2010 | Odinak |
| 7,809,570 | B2 | 10/2010 | Kennewick |
| 7,818,176 | B2 | 10/2010 | Freeman |
| 7,831,426 | B2 | 11/2010 | Bennett |
| 7,831,433 | B1 | 11/2010 | Belvin |
| 7,856,358 | B2 | 12/2010 | Ho |
| 7,873,519 | B2 | 1/2011 | Bennett |
| 7,873,523 | B2 | 1/2011 | Potter |
| 7,873,654 | B2 | 1/2011 | Bernard |
| 7,881,936 | B2 | 2/2011 | Longe |
| 7,890,324 | B2 | 2/2011 | Bangalore |
| 7,894,849 | B2 | 2/2011 | Kass |
| 7,902,969 | B2 | 3/2011 | Obradovich |
| 7,917,367 | B2 | 3/2011 | DiCristo |
| 7,920,682 | B2 | 4/2011 | Byrne |
| 7,949,529 | B2 | 5/2011 | Weider |
| 7,949,537 | B2 | 5/2011 | Walker |
| 7,953,732 | B2 | 5/2011 | Frank |
| 7,974,875 | B1 | 7/2011 | Quilici |
| 7,983,917 | B2 | 7/2011 | Kennewick |

(56) References Cited

U.S. PATENT DOCUMENTS

| | | |
|---|---|---|
| 7,984,287 B2 | 7/2011 | Gopalakrishnan |
| 8,005,683 B2 | 8/2011 | Tessel |
| 8,015,006 B2 | 9/2011 | Kennewick |
| 8,024,186 B1 | 9/2011 | De Bonet |
| 8,027,965 B2 | 9/2011 | Takehara |
| 8,032,383 B1 | 10/2011 | Bhardwaj |
| 8,060,367 B2 | 11/2011 | Keaveney |
| 8,069,046 B2 | 11/2011 | Kennewick |
| 8,073,681 B2 | 12/2011 | Baldwin |
| 8,077,975 B2 | 12/2011 | Ma |
| 8,082,153 B2 | 12/2011 | Coffman |
| 8,086,463 B2 | 12/2011 | Ativanichayaphong |
| 8,103,510 B2 | 1/2012 | Sato |
| 8,112,275 B2 | 2/2012 | Kennewick |
| 8,140,327 B2 | 3/2012 | Kennewick |
| 8,140,335 B2 | 3/2012 | Kennewick |
| 8,145,489 B2 | 3/2012 | Freeman |
| 8,150,694 B2 | 4/2012 | Kennewick |
| 8,155,962 B2 | 4/2012 | Kennewick |
| 8,170,867 B2 | 5/2012 | Germain |
| 8,180,037 B1 | 5/2012 | Delker |
| 8,195,468 B2 | 6/2012 | Weider |
| 8,200,485 B1 | 6/2012 | Lee |
| 8,204,751 B1 | 6/2012 | Di Fabbrizio |
| 8,219,399 B2 | 7/2012 | Lutz |
| 8,219,599 B2 | 7/2012 | Tunstall-Pedoe |
| 8,224,652 B2 | 7/2012 | Wang |
| 8,255,224 B2 | 8/2012 | Singleton |
| 8,326,599 B2 | 12/2012 | Tomeh |
| 8,326,627 B2 | 12/2012 | Kennewick |
| 8,326,634 B2 | 12/2012 | DiCristo |
| 8,326,637 B2 | 12/2012 | Baldwin |
| 8,332,224 B2 | 12/2012 | DiCristo |
| 8,340,975 B1 | 12/2012 | Rosenberger |
| 8,346,563 B1 | 1/2013 | Hjelm |
| 8,370,147 B2 | 2/2013 | Kennewick |
| 8,447,607 B2 | 5/2013 | Weider |
| 8,447,651 B1 | 5/2013 | Scholl |
| 8,452,598 B2 | 5/2013 | Kennewick |
| 8,503,995 B2 | 8/2013 | Ramer |
| 8,509,403 B2 | 8/2013 | Chiu |
| 8,515,765 B2 | 8/2013 | Baldwin |
| 8,527,274 B2 | 9/2013 | Freeman |
| 8,577,671 B1 | 11/2013 | Barve |
| 8,589,161 B2 | 11/2013 | Kennewick |
| 8,612,205 B2 | 12/2013 | Hanneman |
| 8,612,206 B2 | 12/2013 | Chalabi |
| 8,620,659 B2 | 12/2013 | DiCristo |
| 8,719,005 B1 | 5/2014 | Lee |
| 8,719,009 B2 | 5/2014 | Baldwin |
| 8,719,026 B2 | 5/2014 | Kennewick |
| 8,731,929 B2 | 5/2014 | Kennewick |
| 8,738,380 B2 | 5/2014 | Baldwin |
| 8,849,652 B2 | 9/2014 | Weider |
| 8,849,670 B2 | 9/2014 | DiCristo |
| 8,849,696 B2 | 9/2014 | Pansari |
| 8,849,791 B1 | 9/2014 | Hertschuh |
| 8,886,536 B2 | 11/2014 | Freeman |
| 8,972,243 B1 | 3/2015 | Strom |
| 8,983,839 B2 | 3/2015 | Kennewick |
| 9,009,046 B1 | 4/2015 | Stewart |
| 9,015,049 B2 | 4/2015 | Baldwin |
| 9,037,455 B1 | 5/2015 | Faaborg |
| 9,070,366 B1 | 6/2015 | Mathias |
| 9,070,367 B1 | 6/2015 | Hoffmeister |
| 9,105,266 B2 | 8/2015 | Baldwin |
| 9,171,541 B2 | 10/2015 | Kennewick |
| 9,269,097 B2 | 2/2016 | Freeman |
| 9,305,548 B2 | 4/2016 | Kennewick |
| 9,308,445 B1 | 4/2016 | Merzenich |
| 9,406,078 B2 | 8/2016 | Freeman |
| 9,443,514 B1 | 9/2016 | Taubman |
| 9,502,025 B2 | 11/2016 | Kennewick |
| 2001/0039492 A1 | 11/2001 | Nemoto |
| 2001/0041980 A1 | 11/2001 | Howard |
| 2001/0047261 A1 | 11/2001 | Kassan |
| 2001/0049601 A1 | 12/2001 | Kroeker |
| 2001/0054087 A1 | 12/2001 | Flom |
| 2002/0002548 A1 | 1/2002 | Roundtree |
| 2002/0007267 A1 | 1/2002 | Batchilo |
| 2002/0010584 A1 | 1/2002 | Schultz |
| 2002/0015500 A1 | 2/2002 | Belt |
| 2002/0022927 A1 | 2/2002 | Lemelson |
| 2002/0022956 A1 | 2/2002 | Ukrainczyk |
| 2002/0029186 A1 | 3/2002 | Roth |
| 2002/0029261 A1 | 3/2002 | Shibata |
| 2002/0032752 A1 | 3/2002 | Gold |
| 2002/0035501 A1 | 3/2002 | Handel |
| 2002/0040297 A1 | 4/2002 | Tsiao |
| 2002/0049535 A1 | 4/2002 | Rigo |
| 2002/0049805 A1 | 4/2002 | Yamada |
| 2002/0059068 A1 | 5/2002 | Rose |
| 2002/0065568 A1 | 5/2002 | Silfvast |
| 2002/0067839 A1 | 6/2002 | Heinrich |
| 2002/0069059 A1 | 6/2002 | Smith |
| 2002/0069071 A1 | 6/2002 | Knockeart |
| 2002/0073176 A1 | 6/2002 | Ikeda |
| 2002/0082911 A1 | 6/2002 | Dunn |
| 2002/0087312 A1 | 7/2002 | Lee |
| 2002/0087326 A1 | 7/2002 | Lee |
| 2002/0087525 A1 | 7/2002 | Abbott |
| 2002/0107694 A1 | 8/2002 | Lerg |
| 2002/0120609 A1 | 8/2002 | Lang |
| 2002/0124050 A1 | 9/2002 | Middeljans |
| 2002/0133347 A1 | 9/2002 | Schoneburg |
| 2002/0133354 A1 | 9/2002 | Ross |
| 2002/0133402 A1 | 9/2002 | Faber |
| 2002/0135618 A1 | 9/2002 | Maes |
| 2002/0138248 A1 | 9/2002 | Corston-Oliver |
| 2002/0143532 A1 | 10/2002 | McLean |
| 2002/0143535 A1 | 10/2002 | Kist |
| 2002/0152260 A1 | 10/2002 | Chen |
| 2002/0161646 A1 | 10/2002 | Gailey |
| 2002/0161647 A1 | 10/2002 | Gailey |
| 2002/0169597 A1 | 11/2002 | Fain |
| 2002/0173333 A1 | 11/2002 | Buchholz |
| 2002/0173961 A1 | 11/2002 | Guerra |
| 2002/0184373 A1 | 12/2002 | Maes |
| 2002/0188602 A1 | 12/2002 | Stubler |
| 2002/0198714 A1 | 12/2002 | Zhou |
| 2003/0005033 A1 | 1/2003 | Mohan |
| 2003/0014261 A1 | 1/2003 | Kageyama |
| 2003/0016835 A1 | 1/2003 | Elko |
| 2003/0036903 A1 | 2/2003 | Konopka |
| 2003/0046071 A1 | 3/2003 | Wyman |
| 2003/0046281 A1 | 3/2003 | Son |
| 2003/0046346 A1 | 3/2003 | Mumick |
| 2003/0064709 A1 | 4/2003 | Gailey |
| 2003/0065427 A1 | 4/2003 | Funk |
| 2003/0069734 A1 | 4/2003 | Everhart |
| 2003/0069880 A1 | 4/2003 | Harrison |
| 2003/0088421 A1 | 5/2003 | Maes |
| 2003/0093419 A1 | 5/2003 | Bangalore |
| 2003/0097249 A1 | 5/2003 | Walker |
| 2003/0110037 A1 | 6/2003 | Walker |
| 2003/0112267 A1 | 6/2003 | Belrose |
| 2003/0115062 A1 | 6/2003 | Walker |
| 2003/0120493 A1 | 6/2003 | Gupta |
| 2003/0135488 A1 | 7/2003 | Amir |
| 2003/0144846 A1 | 7/2003 | Denenberg |
| 2003/0158731 A1 | 8/2003 | Falcon |
| 2003/0161448 A1 | 8/2003 | Parolkar |
| 2003/0167167 A1 | 9/2003 | Gong |
| 2003/0174155 A1 | 9/2003 | Weng |
| 2003/0182132 A1 | 9/2003 | Niemoeller |
| 2003/0187643 A1 | 10/2003 | VanThong |
| 2003/0204492 A1 | 10/2003 | Wolf |
| 2003/0206640 A1 | 11/2003 | Malvar |
| 2003/0212550 A1 | 11/2003 | Ubale |
| 2003/0212558 A1 | 11/2003 | Matula |
| 2003/0212562 A1 | 11/2003 | Patel |
| 2003/0225825 A1 | 12/2003 | Healey |
| 2003/0233230 A1 | 12/2003 | Ammicht |
| 2003/0236664 A1 | 12/2003 | Sharma |

(56) References Cited

U.S. PATENT DOCUMENTS

| | | |
|---|---|---|
| 2004/0006475 A1 | 1/2004 | Ehlen |
| 2004/0010358 A1 | 1/2004 | Oesterling |
| 2004/0025115 A1 | 2/2004 | Sienel |
| 2004/0030741 A1 | 2/2004 | Wolton |
| 2004/0036601 A1 | 2/2004 | Obradovich |
| 2004/0044516 A1 | 3/2004 | Kennewick |
| 2004/0093567 A1 | 5/2004 | Schabes |
| 2004/0098245 A1 | 5/2004 | Walker |
| 2004/0117179 A1 | 6/2004 | Balasuriya |
| 2004/0117804 A1 | 6/2004 | Scahill |
| 2004/0122673 A1 | 6/2004 | Park |
| 2004/0122674 A1 | 6/2004 | Bangalore |
| 2004/0133793 A1 | 7/2004 | Ginter |
| 2004/0140989 A1 | 7/2004 | Papageorge |
| 2004/0143440 A1 | 7/2004 | Prasad |
| 2004/0148154 A1 | 7/2004 | Acero |
| 2004/0148170 A1 | 7/2004 | Acero |
| 2004/0158555 A1 | 8/2004 | Seedman |
| 2004/0166832 A1 | 8/2004 | Portman |
| 2004/0167771 A1 | 8/2004 | Duan |
| 2004/0172247 A1 | 9/2004 | Yoon |
| 2004/0172258 A1 | 9/2004 | Dominach |
| 2004/0189697 A1 | 9/2004 | Fukuoka |
| 2004/0193408 A1 | 9/2004 | Hunt |
| 2004/0193420 A1 | 9/2004 | Kennewick |
| 2004/0199375 A1 | 10/2004 | Ehsani |
| 2004/0199389 A1 | 10/2004 | Geiger |
| 2004/0201607 A1 | 10/2004 | Mulvey |
| 2004/0205671 A1 | 10/2004 | Sukehiro |
| 2004/0243393 A1 | 12/2004 | Wang |
| 2004/0243417 A9 | 12/2004 | Pitts |
| 2004/0247092 A1 | 12/2004 | Timmins |
| 2004/0249636 A1 | 12/2004 | Applebaum |
| 2005/0015256 A1 | 1/2005 | Kargman |
| 2005/0021331 A1 | 1/2005 | Huang |
| 2005/0021334 A1 | 1/2005 | Iwahashi |
| 2005/0021470 A1 | 1/2005 | Martin |
| 2005/0021826 A1 | 1/2005 | Kumar |
| 2005/0033574 A1 | 2/2005 | Kim |
| 2005/0033582 A1 | 2/2005 | Gadd |
| 2005/0043940 A1 | 2/2005 | Elder |
| 2005/0080632 A1 | 4/2005 | Endo |
| 2005/0102282 A1 | 5/2005 | Linden |
| 2005/0114116 A1 | 5/2005 | Fiedler |
| 2005/0125232 A1 | 6/2005 | Gadd |
| 2005/0131673 A1 | 6/2005 | Koizumi |
| 2005/0137850 A1 | 6/2005 | Odell |
| 2005/0137877 A1 | 6/2005 | Oesterling |
| 2005/0143994 A1 | 6/2005 | Mori |
| 2005/0144013 A1 | 6/2005 | Fujimoto |
| 2005/0144187 A1 | 6/2005 | Che |
| 2005/0149319 A1 | 7/2005 | Honda |
| 2005/0216254 A1 | 9/2005 | Gupta |
| 2005/0222763 A1 | 10/2005 | Uyeki |
| 2005/0234637 A1 | 10/2005 | Obradovich |
| 2005/0234727 A1 | 10/2005 | Chiu |
| 2005/0246174 A1 | 11/2005 | DeGolia |
| 2005/0283364 A1 | 12/2005 | Longe |
| 2005/0283532 A1 | 12/2005 | Kim |
| 2005/0283752 A1 | 12/2005 | Fruchter |
| 2006/0041431 A1 | 2/2006 | Maes |
| 2006/0046740 A1 | 3/2006 | Johnson |
| 2006/0047509 A1 | 3/2006 | Ding |
| 2006/0072738 A1 | 4/2006 | Louis |
| 2006/0074670 A1 | 4/2006 | Weng |
| 2006/0074671 A1 | 4/2006 | Farmaner |
| 2006/0080098 A1 | 4/2006 | Campbell |
| 2006/0100851 A1 | 5/2006 | Schonebeck |
| 2006/0106769 A1 | 5/2006 | Gibbs |
| 2006/0129409 A1 | 6/2006 | Mizutani |
| 2006/0130002 A1 | 6/2006 | Hirayama |
| 2006/0182085 A1 | 8/2006 | Sweeney |
| 2006/0206310 A1 | 9/2006 | Ravikumar |
| 2006/0217133 A1 | 9/2006 | Christenson |
| 2006/0236343 A1 | 10/2006 | Chang |
| 2006/0242017 A1 | 10/2006 | Libes |
| 2006/0253247 A1 | 11/2006 | de Silva |
| 2006/0253281 A1 | 11/2006 | Letzt |
| 2006/0285662 A1 | 12/2006 | Yin |
| 2007/0011159 A1 | 1/2007 | Hillis |
| 2007/0033005 A1 | 2/2007 | Di Cristo |
| 2007/0033020 A1 | 2/2007 | Francois |
| 2007/0033526 A1 | 2/2007 | Thompson |
| 2007/0038436 A1 | 2/2007 | Cristo |
| 2007/0038445 A1 | 2/2007 | Helbing |
| 2007/0043569 A1 | 2/2007 | Potter |
| 2007/0043574 A1 | 2/2007 | Coffman |
| 2007/0043868 A1 | 2/2007 | Kumar |
| 2007/0050191 A1 | 3/2007 | Weider |
| 2007/0050279 A1 | 3/2007 | Huang |
| 2007/0055525 A1 | 3/2007 | Kennewick |
| 2007/0061067 A1 | 3/2007 | Zeinstra |
| 2007/0061735 A1 | 3/2007 | Hoffberg |
| 2007/0073544 A1 | 3/2007 | Millett |
| 2007/0078708 A1 | 4/2007 | Yu |
| 2007/0078709 A1 | 4/2007 | Rajaram |
| 2007/0078814 A1 | 4/2007 | Flowers |
| 2007/0094003 A1 | 4/2007 | Huang |
| 2007/0100797 A1 | 5/2007 | Thun |
| 2007/0112555 A1 | 5/2007 | Lavi |
| 2007/0112630 A1 | 5/2007 | Lau |
| 2007/0118357 A1 | 5/2007 | Kasravi |
| 2007/0124057 A1 | 5/2007 | Prieto |
| 2007/0135101 A1 | 6/2007 | Ramati |
| 2007/0146833 A1 | 6/2007 | Satomi |
| 2007/0162296 A1 | 7/2007 | Altberg |
| 2007/0174258 A1 | 7/2007 | Jones |
| 2007/0179778 A1 | 8/2007 | Gong |
| 2007/0185859 A1 | 8/2007 | Flowers |
| 2007/0186165 A1 | 8/2007 | Maislos |
| 2007/0192309 A1 | 8/2007 | Fischer |
| 2007/0198267 A1 | 8/2007 | Jones |
| 2007/0203699 A1 | 8/2007 | Nagashima |
| 2007/0203736 A1 | 8/2007 | Ashton |
| 2007/0208732 A1 | 9/2007 | Flowers |
| 2007/0214182 A1 | 9/2007 | Rosenberg |
| 2007/0250901 A1 | 10/2007 | McIntire |
| 2007/0265850 A1 | 11/2007 | Kennewick |
| 2007/0266257 A1 | 11/2007 | Camaisa |
| 2007/0276651 A1 | 11/2007 | Bliss |
| 2007/0294615 A1 | 12/2007 | Sathe |
| 2007/0299824 A1 | 12/2007 | Pan |
| 2008/0014908 A1 | 1/2008 | Vasant |
| 2008/0034032 A1 | 2/2008 | Healey |
| 2008/0046311 A1 | 2/2008 | Shahine |
| 2008/0059188 A1 | 3/2008 | Konopka |
| 2008/0065386 A1 | 3/2008 | Cross |
| 2008/0065389 A1 | 3/2008 | Cross |
| 2008/0065390 A1 | 3/2008 | Ativanichayaphong |
| 2008/0086455 A1 | 4/2008 | Meisels |
| 2008/0091406 A1 | 4/2008 | Baldwin |
| 2008/0103761 A1 | 5/2008 | Printz |
| 2008/0103781 A1 | 5/2008 | Wasson |
| 2008/0104071 A1 | 5/2008 | Pragada |
| 2008/0109285 A1 | 5/2008 | Reuther |
| 2008/0115163 A1 | 5/2008 | Gilboa |
| 2008/0126091 A1 | 5/2008 | Clark |
| 2008/0133215 A1 | 6/2008 | Sarukkai |
| 2008/0140385 A1 | 6/2008 | Mahajan |
| 2008/0147396 A1 | 6/2008 | Wang |
| 2008/0147410 A1 | 6/2008 | Odinak |
| 2008/0147637 A1 | 6/2008 | Li |
| 2008/0154604 A1 | 6/2008 | Sathish |
| 2008/0162471 A1 | 7/2008 | Bernard |
| 2008/0177530 A1 | 7/2008 | Cross |
| 2008/0184164 A1 | 7/2008 | Di Fabbrizio |
| 2008/0189110 A1 | 8/2008 | Freeman |
| 2008/0228496 A1 | 9/2008 | Yu |
| 2008/0235023 A1 | 9/2008 | Kennewick |
| 2008/0235027 A1 | 9/2008 | Cross |
| 2008/0269958 A1 | 10/2008 | Filev |
| 2008/0270135 A1 | 10/2008 | Goel |
| 2008/0270224 A1 | 10/2008 | Portman |
| 2008/0294437 A1 | 11/2008 | Nakano |

(56) References Cited

U.S. PATENT DOCUMENTS

| | | |
|---|---|---|
| 2008/0294994 A1 | 11/2008 | Kruger |
| 2008/0306743 A1 | 12/2008 | Di Fabbrizio |
| 2008/0319751 A1 | 12/2008 | Kennewick |
| 2009/0006077 A1 | 1/2009 | Keaveney |
| 2009/0006194 A1 | 1/2009 | Sridharan |
| 2009/0018829 A1 | 1/2009 | Kuperstein |
| 2009/0024476 A1 | 1/2009 | Baar |
| 2009/0030686 A1 | 1/2009 | Weng |
| 2009/0052635 A1 | 2/2009 | Jones |
| 2009/0055176 A1 | 2/2009 | Hu |
| 2009/0067599 A1 | 3/2009 | Agarwal |
| 2009/0076827 A1 | 3/2009 | Bulitta |
| 2009/0106029 A1 | 4/2009 | DeLine |
| 2009/0117885 A1 | 5/2009 | Roth |
| 2009/0144131 A1 | 6/2009 | Chiu |
| 2009/0144271 A1 | 6/2009 | Richardson |
| 2009/0150156 A1 | 6/2009 | Kennewick |
| 2009/0157382 A1 | 6/2009 | Bar |
| 2009/0164216 A1 | 6/2009 | Chengalvarayan |
| 2009/0171664 A1 | 7/2009 | Kennewick |
| 2009/0171912 A1 | 7/2009 | Nash |
| 2009/0197582 A1 | 8/2009 | Lewis |
| 2009/0216540 A1 | 8/2009 | Tessel |
| 2009/0248565 A1 | 10/2009 | Chuang |
| 2009/0248605 A1 | 10/2009 | Mitchell |
| 2009/0259561 A1 | 10/2009 | Boys |
| 2009/0259646 A1 | 10/2009 | Fujita |
| 2009/0265163 A1 | 10/2009 | Li |
| 2009/0271194 A1 | 10/2009 | Davis |
| 2009/0273563 A1 | 11/2009 | Pryor |
| 2009/0276700 A1 | 11/2009 | Anderson |
| 2009/0287680 A1 | 11/2009 | Paek |
| 2009/0299745 A1 | 12/2009 | Kennewick |
| 2009/0299857 A1 | 12/2009 | Brubaker |
| 2009/0304161 A1 | 12/2009 | Pettyjohn |
| 2009/0307031 A1 | 12/2009 | Winkler |
| 2009/0313026 A1 | 12/2009 | Coffman |
| 2009/0319517 A1 | 12/2009 | Guha |
| 2010/0023320 A1 | 1/2010 | Cristo |
| 2010/0023331 A1 | 1/2010 | Duta |
| 2010/0029261 A1 | 2/2010 | Mikkelsen |
| 2010/0036967 A1 | 2/2010 | Caine |
| 2010/0049501 A1 | 2/2010 | Kennewick |
| 2010/0049514 A1 | 2/2010 | Kennewick |
| 2010/0057443 A1 | 3/2010 | Cristo |
| 2010/0063880 A1 | 3/2010 | Atsmon |
| 2010/0064025 A1 | 3/2010 | Nelimarkka |
| 2010/0094707 A1 | 4/2010 | Freer |
| 2010/0138300 A1 | 6/2010 | Wallis |
| 2010/0145700 A1 | 6/2010 | Kennewick |
| 2010/0185512 A1 | 7/2010 | Borger |
| 2010/0204986 A1 | 8/2010 | Kennewick |
| 2010/0204994 A1 | 8/2010 | Kennewick |
| 2010/0217604 A1 | 8/2010 | Baldwin |
| 2010/0268536 A1 | 10/2010 | Suendermann |
| 2010/0286985 A1 | 11/2010 | Kennewick |
| 2010/0299142 A1 | 11/2010 | Freeman |
| 2010/0312566 A1 | 12/2010 | Odinak |
| 2010/0318357 A1 | 12/2010 | Istvan |
| 2010/0331064 A1 | 12/2010 | Michelstein |
| 2011/0022393 A1 | 1/2011 | Waller |
| 2011/0106527 A1 | 5/2011 | Chiu |
| 2011/0112827 A1 | 5/2011 | Kennewick |
| 2011/0112921 A1 | 5/2011 | Kennewick |
| 2011/0119049 A1 | 5/2011 | Ylonen |
| 2011/0131036 A1 | 6/2011 | DiCristo |
| 2011/0131045 A1 | 6/2011 | Cristo |
| 2011/0231182 A1 | 9/2011 | Weider |
| 2011/0231188 A1 | 9/2011 | Kennewick |
| 2011/0238409 A1 | 9/2011 | Larcheveque |
| 2011/0307167 A1 | 12/2011 | Taschereau |
| 2012/0022857 A1 | 1/2012 | Baldwin |
| 2012/0041753 A1 | 2/2012 | Dymetman |
| 2012/0046935 A1 | 2/2012 | Nagao |
| 2012/0101809 A1 | 4/2012 | Kennewick |
| 2012/0101810 A1 | 4/2012 | Kennewick |
| 2012/0109753 A1 | 5/2012 | Kennewick |
| 2012/0150620 A1 | 6/2012 | Mandyam |
| 2012/0150636 A1 | 6/2012 | Freeman |
| 2012/0239498 A1 | 9/2012 | Ramer |
| 2012/0240060 A1 | 9/2012 | Pennington |
| 2012/0265528 A1 | 10/2012 | Gruber |
| 2012/0278073 A1 | 11/2012 | Weider |
| 2013/0006734 A1 | 1/2013 | Ocko |
| 2013/0054228 A1 | 2/2013 | Baldwin |
| 2013/0060625 A1 | 3/2013 | Davis |
| 2013/0080177 A1 | 3/2013 | Chen |
| 2013/0211710 A1 | 8/2013 | Kennewick |
| 2013/0253929 A1 | 9/2013 | Weider |
| 2013/0254314 A1 | 9/2013 | Chow |
| 2013/0297293 A1 | 11/2013 | Cristo |
| 2013/0304473 A1 | 11/2013 | Baldwin |
| 2013/0311324 A1 | 11/2013 | Stoll |
| 2013/0332454 A1 | 12/2013 | Stuhec |
| 2013/0339022 A1 | 12/2013 | Baldwin |
| 2014/0006951 A1 | 1/2014 | Hunter |
| 2014/0012577 A1 | 1/2014 | Freeman |
| 2014/0025371 A1 | 1/2014 | Min |
| 2014/0108013 A1 | 4/2014 | Cristo |
| 2014/0136187 A1* | 5/2014 | Wolverton ........ G06F 17/30654 704/9 |
| 2014/0156278 A1 | 6/2014 | Kennewick |
| 2014/0195238 A1 | 7/2014 | Terao |
| 2014/0236575 A1 | 8/2014 | Tur |
| 2014/0249821 A1 | 9/2014 | Kennewick |
| 2014/0249822 A1 | 9/2014 | Baldwin |
| 2014/0278413 A1 | 9/2014 | Pitschel |
| 2014/0278416 A1 | 9/2014 | Schuster |
| 2014/0288934 A1 | 9/2014 | Kennewick |
| 2014/0330552 A1 | 11/2014 | Bangalore |
| 2014/0365222 A1 | 12/2014 | Weider |
| 2015/0019211 A1 | 1/2015 | Simard |
| 2015/0019217 A1 | 1/2015 | Cristo |
| 2015/0019227 A1 | 1/2015 | Anandarajah |
| 2015/0066479 A1 | 3/2015 | Pasupalak |
| 2015/0066627 A1 | 3/2015 | Freeman |
| 2015/0073910 A1 | 3/2015 | Kennewick |
| 2015/0095159 A1 | 4/2015 | Kennewick |
| 2015/0142447 A1 | 5/2015 | Kennewick |
| 2015/0170641 A1 | 6/2015 | Kennewick |
| 2015/0193379 A1 | 7/2015 | Mehta |
| 2015/0199339 A1 | 7/2015 | Mirkin |
| 2015/0228276 A1 | 8/2015 | Baldwin |
| 2015/0293917 A1 | 10/2015 | Bufe |
| 2015/0348544 A1 | 12/2015 | Baldwin |
| 2015/0348551 A1 | 12/2015 | Gruber |
| 2015/0364133 A1 | 12/2015 | Freeman |
| 2016/0049152 A1 | 2/2016 | Kennewick |
| 2016/0078482 A1 | 3/2016 | Kennewick |
| 2016/0078491 A1 | 3/2016 | Kennewick |
| 2016/0078504 A1 | 3/2016 | Kennewick |
| 2016/0078773 A1 | 3/2016 | Carter |
| 2016/0110347 A1 | 4/2016 | Kennewick |
| 2016/0148610 A1 | 5/2016 | Kennewick |
| 2016/0148612 A1 | 5/2016 | Guo |
| 2016/0188292 A1 | 6/2016 | Carter |
| 2016/0188573 A1 | 6/2016 | Tang |
| 2016/0217785 A1 | 7/2016 | Kennewick |
| 2016/0335676 A1 | 11/2016 | Freeman |

FOREIGN PATENT DOCUMENTS

| | | |
|---|---|---|
| EP | 1320043 A2 | 6/2003 |
| EP | 1646037 | 4/2006 |
| JP | H08263258 | 10/1996 |
| JP | H11249773 | 9/1999 |
| JP | 2001071289 | 3/2001 |
| JP | 2006146881 | 6/2006 |
| JP | 2008027454 | 2/2008 |
| JP | 2008058465 | 3/2008 |
| JP | 2008139928 | 6/2008 |
| JP | 2011504304 | 2/2011 |
| JP | 2012518847 | 8/2012 |
| WO | 9946763 | 9/1999 |

(56) References Cited

FOREIGN PATENT DOCUMENTS

| WO | 0021232 | 1/2000 |
| WO | 0046792 | 1/2000 |
| WO | 0171609 A2 | 9/2001 |
| WO | 0178065 | 10/2001 |
| WO | 2004072954 | 8/2004 |
| WO | 2005010702 A2 | 2/2005 |
| WO | 2007019318 | 1/2007 |
| WO | 2007021587 | 1/2007 |
| WO | 2007027546 | 1/2007 |
| WO | 2007027989 | 1/2007 |
| WO | 2008098039 | 1/2008 |
| WO | 2008118195 | 1/2008 |
| WO | 2009075912 | 1/2009 |
| WO | 2009145796 | 1/2009 |
| WO | 2009111721 | 9/2009 |
| WO | 2010096752 | 1/2010 |
| WO | 2016044290 | 3/2016 |
| WO | 2016044316 | 3/2016 |
| WO | 2016044319 | 3/2016 |
| WO | 2016044321 | 3/2016 |
| WO | 2016061309 | 4/2016 |

OTHER PUBLICATIONS

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

Bazzi, Issam et al., "Heterogeneous Lexical Units for Automatic Speech Recognition: Preliminary Investigations", Proceedings of the IEEE International Conference on Acoustics, Speech, and Signal Processing, vol. 3, Jun. 5-9, 2000, XP010507574, pp. 1257-1260.

Belvin, Robert, et al., "Development of the HRL Route Navigation Dialogue System", Proceedings of the First International Conference on Human Language Technology Research, San Diego, 2001, pp. 1-5.

Chai et al., "MIND: A Semantics-Based Multimodal Interpretation Framework for Conversational Systems", Proceedings of the International CLASS Workshop on Natural, Intelligent and Effective Interaction in Multimodal Dialogue Systems, Jun. 2002, pp. 37-46.

Cheyer et al., "Multimodal Maps: An Agent-Based Approach", International Conference on Cooperative Multimodal Communication (CMC/95), May 24-26, 1995, pp. 111-121.

Davis, Z., et al., A Personal Handheld Multi-Modal Shopping Assistant, IEEE, 2006, 9 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Elio et al., "On Abstract Task Models and Conversation Policies" in Workshop on Specifying and Implementing Conversation Policies, Autonomous Agents '99, Seattle, 1999, 10 pages.

Kirchhoff, Katrin, "Syllable-Level Desynchronisation of Phonetic Features for Speech Recognition", Proceedings of the Fourth International Conference on Spoken Language, 1996, ICSLP 96, vol. 4, IEEE, 1996, 3 pages.

Kuhn, Thomas, et al., "Hybrid In-Car Speech Recognition for Mobile Multimedia Applications", Vehicular Technology Conference, IEEE, Jul. 1999, pp. 2009-2013.

Lin, Bor-shen, et al., "A Distributed Architecture for Cooperative Spoken Dialogue Agents with Coherent Dialogue State and History", ASRU'99, 1999, 4 pages.

Lind, R., et al., "The Network Vehicle—A Glimpse into the Future of Mobile Multi-Media", IEEE Aerosp. Electron. Systems Magazine, vol. 14, No. 9, Sep. 1999, pp. 27-32.

Mao, Mark Z., "Automatic Training Set Segmentation for Multi-Pass Speech Recognition", Department of Electrical Engineering, Stanford University, CA, copyright 2005, IEEE, pp. I-685 to I-688.

O'Shaughnessy, Douglas, "Interacting with Computers by Voice: Automatic Speech Recognition and Synthesis", Proceedings of the IEEE, vol. 91, No. 9, Sep. 1, 2003, XP011100665. pp. 1272-1305.

Reuters, "IBM to Enable Honda Drivers to Talk to Cars", Charles Schwab & Co., Inc., Jul. 28, 2002, 1 page.

Turunen, "Adaptive Interaction Methods in Speech User Interfaces", Conference on Human Factors in Computing Systems, Seattle, Washington, 2001, pp. 91-92.

Vanhoucke, Vincent, "Confidence Scoring and Rejection Using Multi-Pass Speech Recognition", Nuance Communications, Menlo Park, CA, 2005, 4 pages.

Weng, Fuliang, et al., "Efficient Lattice Representation and Generation", Speech Technology and Research Laboratory, SRI International, Menlo Park, CA, 1998, 4 pages.

Wu, Su-Lin, et al., "Incorporating Information from Syllable-Length Time Scales into Automatic Speech Recognition", Proceedings of the 1998 IEEE International Conference on Acoustics, Speech and Signal Processing, 1998, vol. 2, IEEE, 1998, 4 pages.

Wu, Su-Lin, et al., "Integrating Syllable Boundary Information into Speech Recognition", IEEE International Conference on Acoustics, Speech, and Signal Processing, ICASSP-97, 1997, vol. 2, IEEE, 1997, 4 pages.

Zhao, Yilin, "Telematics: Safe and Fun Driving", IEEE Intelligent Systems, vol. 17, Issue 1, 2002, pp. 10-14.

\* cited by examiner

SYSTEM AND METHOD FOR PROVIDING FOLLOW-UP RESPONSES TO PRIOR NATURAL LANGUAGE INPUTS OF A USER

CROSS-REFERENCE TO RELATED APPLICATIONS

This application is a continuation of U.S. patent application Ser. No. 14/884,030, entitled "System and Method for Providing Follow-Up Responses to Prior Natural Language Inputs of a User", filed on Oct. 15, 2015, which claims the benefit of U.S. Provisional Patent Application Ser. No. 62/064,329 filed Oct. 15, 2014 entitled "System and Method for Providing Follow-up Responses to Prior Natural Language Inputs of a User", the entireties of which are incorporated herein by reference.

FIELD OF THE INVENTION

The invention relates to systems and methods of providing responses to natural language inputs.

BACKGROUND OF THE INVENTION

Electronic user devices have emerged to become nearly ubiquitous in the everyday lives of many people. One of the reasons for this increased use is the convenience of receiving information with a user device, for example, via personal assistant software capable of processing natural language input. In many cases, however, information for providing an adequate response to a natural language request from a user may not be immediately available or accessible to the personal assistant software (e.g., because of poor network connectivity, service outage, etc.). In such cases, the personal assistant is unable to provide an adequate response and the user has to remember to provide the query at a later time to receive an adequate response. These and other drawbacks exist.

SUMMARY OF THE INVENTION

The invention relates to systems and methods for providing responses to natural language inputs. As an example, system responses to natural language inputs (e.g., utterances, gestures, etc.) may be facilitated by enabling follow-up responses (or real-time updates in the form of follow-up responses) to prior natural language inputs of a user (or the user's prior requests). These follow-up responses may, for instance, be provided for presentation to the user without the user having to specify a need for a follow-up. As such, in an implementation, a user need not provide a user request specifying one or more system actions to be performed at a later time for those system actions to be subsequently performed.

In one scenario, for example, a user may ask a personal assistant application to set a thermostat in his/her house to a certain temperature (e.g., "72 degrees or other temperature"). However, a service associated with the thermostat may be temporarily down, the personal assistant application may not be able to immediately satisfy the user's command. As such, as a result of its inability to receive confirmation of a connection with the associated service, the personal assistant application may alert the user of its inability to currently connect to the user's thermostat and indicate that it will follow-up with the user when it is able to set the user's thermostat to the requested temperature. The personal assistant application may thereafter periodically check with the associated service to see if access to set the thermostat is available. When the access becomes available (and without further user input regarding setting of the thermostat after the user's initial command) the personal assistant application may transmit instructions to set the thermostat to the requested temperature. Upon receiving confirmation of the requested setting from the associated service, the personal assistant application may provide a follow-up response for presentation to the user that informs the user that the thermostat has been set to the requested temperature.

In another scenario, a user may ask a personal assistant application to inform him/her of nearby pizza restaurants (e.g., "Are there pizza restaurant around here?"). However, if the personal assistant application is hosted on a user device of the user, and the user device does not currently have network access (e.g., no cellular or WiFi connection), the personal assistant application may inform the user of the lack of network access and that it will follow-up with the user when it is able to perform the requested query. At a subsequent time, upon detection of network access (and without further user input regarding queries for pizza restaurants), the personal assistant application may initiate the requested query. When the results of the requested query are received, the personal assistant application may formulate a response for presentation to the user based on the query results.

In an implementation, a follow-up response to a prior natural language input may be provided for presentation to a user during an interactive session (e.g., between a personal assistant application and the user) other than the interactive session in which the user provided the prior natural language input. As such, in some cases, one or more subsequent natural language inputs may be received from the user and/or system responses to the subsequent natural language inputs may be provided to the user before the follow-up response is provided. In further cases, the subsequent user inputs and their corresponding responses may not be related to the prior natural language input for which the follow-up response is provided.

In an implementation, context information associated with an interactive session between a system (or a personal assistant application thereof) and a user may be utilized to tailor a follow-up response provided during the interactive session. As an example, if the topic of the current interactive session (e.g., a subsequent dialog session) is different than a topic of the prior natural language input (or its related user request), the system may utilize the context information associated with the interactive session to generate a follow-up response to the prior natural language input that may "fit" better within the current interactive session. In one use case, for instance, if the prior natural language input comprises a query for a friend's birthday, and the information regarding the friend's birthday is obtained during a dialog between the system and the user about the user's anniversary, the follow-up response that is generated so that the response is related (at least in part) to the current dialog (e.g., "Speaking of important dates, you asked me earlier about your friend's birthday; it's next Friday").

Various other aspects of the invention will be apparent through the detailed description of the invention and the drawings attached hereto. It is also to be understood that both the foregoing general description and the following detailed description are exemplary and not restrictive of the scope of the invention. As used in the specification and in the claims, the singular form of "a", "an", and "the" include plural referents unless the context clearly dictates otherwise.

In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Figure 1:
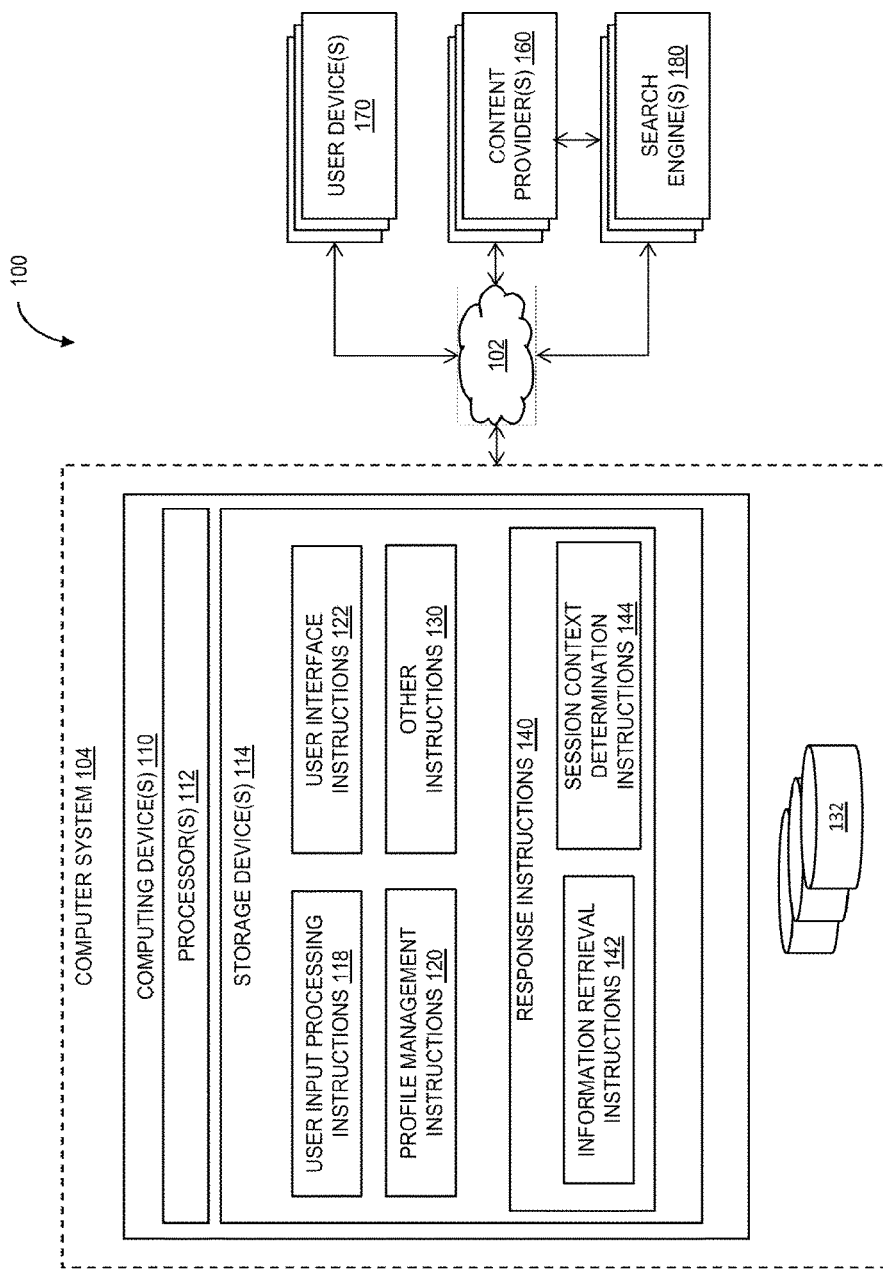
FIG. 1 illustrates a system for providing follow-up responses to prior natural language inputs associated with a user, according to an implementation of the invention.

FIG. 1 illustrates a system 100 of providing follow-up responses to prior natural language inputs associated with a user, according to an implementation of the invention.

In an implementation, system 100 may facilitate natural language responses to natural language inputs (e.g., utterances, gestures, etc.) by enabling follow-up and/or real time updated responses for prior natural language inputs of a user (e.g., the user's prior requests) without the user having to specify a need for follow-up. In an implementation, system 100 may be enabled to obtain one or more follow-up and/or real-time updates related to a prior natural language input of a user, and provide one or more follow-up and/or real-time responses to the prior natural language input. In an implementation, the follow-up and/or real-time updates and responses to/from system 100 to prior natural language inputs of a user may be facilitated by enabling asynchronous full-duplex interaction between the user and system 100. As an example, multiple channels of communication between a personal assistant application of system 100 and the user may be provided, allowing at least one channel for the personal assistant application to receive natural language inputs (or its corresponding user request) from the user, and at least one channel for the personal assistant application to provide responses to the user. A user input may, for instance, trigger one or more system responses (e.g., including system follow-up responses) that may be provided before, during, or after receipt of subsequent user inputs and/or responses to those subsequent user inputs. In this way, a user and a personal assistant may continue a dialog with one another without having to wait for the personal assistant to provide a response (or an adequate response) to any particular natural language input of the user.

In an implementation, system 100 may continue to receive and/or respond to natural language inputs from a user before providing a response (or an adequate response) to a prior natural language input. System 100 may be enabled to subsequently provide a follow-up response when it is able to obtain sufficient information related to the prior natural language input to provide an adequate response. In this way, a user and system 100 may continue to dialog with one another without having to wait for system 100 to provide a response (or an adequate response) to any particular natural language input of the user. For example, the user may input a query: "When is Jane Doe's birthday?" System 100 may analyze the query and determine that the best place to look for an answer to this query is the Facebook profile of Jane Doe. However, in one scenario, Facebook may be inaccessible from the network available to system 100 (e.g., because of an office firewall). System 100 may then respond to the user with a response indicating that Jane Doe's Facebook profile is not currently accessible (and/or that it will get back to the user at a later time). System 100 may then continue to interact with the user rather than waiting for the Facebook profile to be accessible. Nevertheless, when system 100 eventually obtains information specifying Jane Doe's birthday (e.g., from her Facebook profile or an alternative source), it may thereafter follow-up with a subsequent response to the user's initial query that specifies Jane Doe's birthday.

In an implementation, system 100 may obtain updated information related to a natural language input for which system 100 has previously provided a response. System 100 may generate a follow-up response based on the updated information, and provide the follow-up response for the natural language input (e.g., even if an adequate response to the natural language input may have previously been provided by system 100).

For example, a user may input a query: "How long will it take to get home today?" System 100 may then query a mapping and traffic application to provide an estimated time of travel based on current traffic conditions. Since the user did not provide a time of departure, the current estimated time of travel may be considered an adequate response. The user may continue to interact with system 100, e.g., to set up a reminder for picking up groceries on the way home. The user may at a subsequent time decide to use a messaging application to send a message to his/her spouse indicating that the user is on the way home. Upon processing of the message, system 100 may determine that the user is driving (or about to drive) home. As such, based on this determination, and without further user input requesting an estimated travel time, system 100 may reassess the current traffic conditions and provide an estimated time of travel as a follow-up response to the user's prior inquiry for an estimated travel time to the user's house.

In an implementation, system 100 may obtain updated information and provide follow-up responses (based on the updated information) in real-time. For example, a user may input a query: "Who is winning the Monte Carlo Formula 1 Grand Prix?" In this instance, as the positions of drivers competing in the race change, system 100 may keep providing follow-up responses to the user, e.g., "Felipe Massa is currently in the first position"; "Lewis Hamilton has just passed Felipe Massa to take back the first position" and so forth. In an implementation, for example, these follow-up responses regarding the Formula 1 race may be provided by a personal assistant in between receipt of other natural language inputs (e.g., related to other user requests) from the user and/or responses of the personal assistant to the other natural language inputs.

In an implementation, upon generation of a follow-up response based on updated information related to a prior natural language input of a user, system 100 may provide the follow-up response to the user during an interactive session (e.g., a dialog) between system 100 and the user that is related or unrelated to the prior natural language input from the user. For example, after receiving a first response (e.g., "Felipe Massa is currently in the first position"), the user may decide to continue a dialog with system 100 with inputs relating to current standings of teams and drivers in the current Formula 1 season. If during this dialog, system 100 receives the updated information indicating that Lewis Hamilton has passed Felipe Massa, system 100 may interrupt the dialog to provide this updated information (with a response, e.g., "By the way, Lewis Hamilton has just passed Felipe Massa to take back the first position") and subsequently provide responses to the user's queries relating to the current standings.

Alternatively, in an implementation, a determination to provide a follow-up response based on the updated information may be effectuated without regard to whether the interactive session is related to the prior natural language input. After receiving the first response, the user may decide to set up reminders for various meetings that the user is supposed to attend. If during this dialog, system 100 receives the updated information regarding a change in position in the race, system 100 may interrupt the session relating to the reminders to provide the updated race status and subsequently continue with setting reminders.

In another implementation, information regarding an interactive session (e.g., context information associated with the interactive session) may be utilized to tailor follow-up responses (to prior natural language inputs) that are provided during the interactive session. For example, a user may have input a query regarding Jane Doe's birthday at a time when the best resource (e.g., Facebook profile) for providing a correct answer to the query may be inaccessible to system 100. At a later time, if the Facebook profile of Jane Doe becomes accessible, system 100 may interrupt whatever interactive session the user may be engaged in (e.g., even if the session is regarding a different topic, such as Formula 1 racing) to provide Jane Doe's birthday. Upon recognizing that the topic of the current interactive session is unrelated to the user's prior inquiry, system 100 may apologize for the interruption and remind the user of the prior inquiry before informing the user of Jane Doe's birthday (e.g., "Sorry to interrupt, but you previously asked about Jane Doe's birthday. It's next Wednesday."). Additionally, as an example, if system 100 determines that Jane Doe's birthday is the same as some famous Formula 1 driver (e.g., Nicki Lauda), system 100, in the context of Formula 1 racing, may provide this additional information in the follow-up response (e.g., "It so happens that Jane Doe has the same birthday as Nicki Lauda").

Other uses of system 100 are described herein and still others will be apparent to those having skill in the art. Having described a high level overview of some of the system functions, attention will now be turned to various system components that facilitate these and other functions.

System Components

System 100 may include a computer system 104, one or more content providers 160, one or more user devices 170, one or more search engines 180, and/or other components. Computer system 104 may interface with search engine(s) 180 to query for information for providing a response to a natural language user input, and/or content provider(s) 160 to allow users to access information offered by content provider(s) 160. Search engine(s) 180 may interface with content provider(s) to provide the information to computer system 104. Computer system 104 may further interface with various interfaces of the user device(s) 170 such that users may interact with computer system 104.

To facilitate these and other functions, computer system 104 may include one or more computing devices 110. Each computing device 110 may include one or more processors 112, one or more storage devices 114, and/or other components.

Processor(s) 112 may be programmed by one or more computer program instructions, which may be stored in storage device(s) 114. The computer program instructions may include, without limitation, user input processing instructions 118, profile management instructions 120, user interface instructions 122, response instructions 140, and/or other instructions 130, each of which may themselves include different sets of instructions that each program the processor(s) 112 (and therefore computer system 104) to perform one or more operations described herein. For example, response instructions 140 may include information retrieval instructions 142, and session context determination instructions 144. Other applications may, of course, include one or more of the instructions 118-152 to perform one or more operations as described herein.

In some implementations, a given user device 170 may comprise a given computer device 110. As such, the given user device 170 may comprise processor(s) 112 that are programmed with one or more computer program instructions, such as user input processing instructions 118, profile management instructions 120, user interface instructions 122, response instructions 140, information retrieval instructions 142, session context determination instructions 144, or other instructions 130.

As used hereinafter, for convenience, the foregoing instructions will be described as performing an operation, when, in fact, the various instructions may program processor(s) 112 (and thereafter computer system 104) to perform the operation. It should be appreciated that the various instructions are described individually as discreet sets of instructions by way of illustration and not limitation, as two or more of the instructions may be combined.

User Input Processing

In an implementation, user input processing instructions 118 may process one or more user inputs of a user to determine one or more user requests that are intended by the user when the user provided the user inputs. The user inputs may comprise an auditory input (e.g., received via a microphone), a visual input (e.g., received via a camera), a tactile input (e.g., received via a touch sensor device), an olfactory input, a gustatory input, a keyboard input, a mouse input, or other user input. As described elsewhere herein, user input processing instructions 118 may comprise instructions associated with one or more speech recognition engines (e.g., speech recognition engine(s) 220 of FIG. 2), one or more natural language processing engines (e.g., natural language processing engine(s) 230 of FIG. 2), or other components for processing user inputs to determine user requests related to the user inputs.

In one use case, if the user input is a natural language utterance spoken by a user, the natural language utterance may be processed by a speech recognition engine to recognize one or more words of the natural language utterance. The recognized words may then be processed, along with context information associated with the user, by a natural language processing engine to determine a user request intended by the user when the user provided the natural language utterance. A determination of the user request may, for instance, comprise predicting one or more potential user requests intended by the user, assigning a confidence score to each of the potential user requests, and selecting the potential user request with the highest confidence score as the user request intended by the user.

Figure 2:
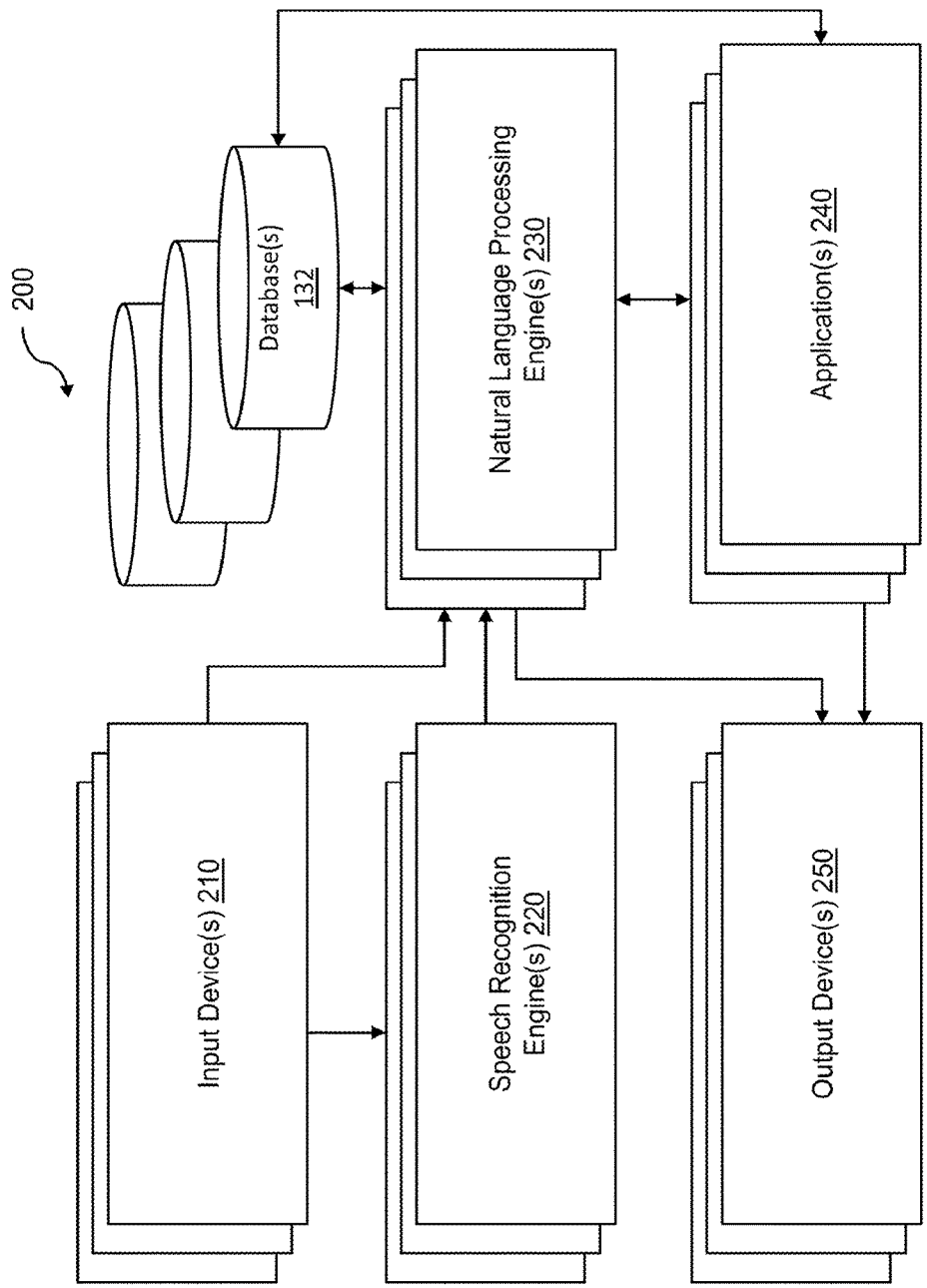
FIG. 2 illustrates a system for facilitating natural language processing, according to an implementation of the invention.

FIG. 2 illustrates a system 200 for facilitating natural language processing, according to an implementation of the invention. As shown in FIG. 2, system 200 may comprise input device(s) 210, speech recognition engine(s) 220, natural language processing engine(s) 230, application(s) 240, output device(s) 250, database(s) 132, or other components.

In an implementation, one or more components of system 200 may comprise one or more computer program instructions of FIG. 1 and/or processor(s) 112 programmed with the computer program instructions of FIG. 1. As an example, speech recognition engine(s) 220 and/or natural language processing engine(s) 230 may comprise user input processing instructions 118 or other instructions 130 (e.g., mapping instructions, context determination instructions, or other instructions).

Input device(s) 210 may comprise an auditory input device (e.g., microphone), a visual input device (e.g., camera), a tactile input device (e.g., touch sensor), an olfactory input device, a gustatory input device, a keyboard, a mouse, or other input devices. Input received at input device(s) 210 may be provided to speech recognition engine(s) 220 and/or natural language processing engine(s) 230.

Speech recognition engine(s) 220 may process one or more inputs received from input device(s) 210 to recognize one or more words represented by the received inputs. As an example, with respect to auditory input, speech recognition engine(s) 220 may process an audio stream captured by an auditory input device to isolate segments of sound of the audio stream. The sound segments (or a representation of the sound segments) are then processed with one or more speech models (e.g., acoustic model, lexicon list, language model, etc.) to recognize one or more words of the received inputs. Upon recognition of the words of received inputs, the recognized words may then be provided to natural language processing engine(s) 230 for further processing. In other examples, natural language processing engine(s) 230 may process one or more other types of inputs (e.g., visual input representing sign language communication, gestures, or other forms of communication) to recognize one or more words represented by the other types of inputs.

Natural language processing engine(s) 230 may receive one or more inputs from input device(s) 210, speech recognition engine(s) 220, application(s) 240, database(s) 132, or other components. As an example, natural language processing engine(s) 230 may process inputs received from input device(s) 210, such as user inputs (e.g., voice, non-voice, etc.), location-based inputs (e.g., GPS data, cell ID, etc.), other sensor data input, or other inputs to determine context information associated with one or more user inputs. As another example, natural language processing engine(s) 230 may obtain grammar information, profile information, context information, or other information from database(s) 132. The obtained information (or context information determined based on inputs from input device(s) 210) may be processed to determine one or more user requests associated with one or more user inputs of a user. In yet another example, natural language processing engine(s) 230 may process one or more recognized words from speech recognition engine(s) 220 and other information (e.g., information from input device(s) 210, application(s) 240, and/or database(s) 132) to determine one or more user requests associated with one or more user inputs of a user.

In an implementation, natural language processing engine(s) 230 may solicit further inputs from a user by responding with a request for more information via output device(s) 250 if, for instance, a user request associated with a user input of a user cannot be determined with sufficient confidence, more information would helpful to process the user request, etc.

In an implementation, upon determination of a user request of a user, natural language processing engine(s) 230 may determine an application 240 suitable for executing the user request, and provide the user request to the application for further processing. In one scenario, the application 240 may provide one or more results of the user request to output device(s) 250 for presentation to the user.

In an implementation, the application 240 may provide the results of the user request to natural language processing engine(s) 230 for further processing. As an example, the results of the user request may comprise intermediate results that are provided as a parameter for another user request of the user that is to be executed at another application 240. As such, the natural language processing engine(s) 230 may generate the other user request based on the intermediate results, and provide the other user request to the other application 240. As another example, natural language processing engine(s) 230 may formulate a natural language response based on the results received from the application 240, and provide the natural language response to output device(s) 250 for presentation to the user.

In an implementation, a given application 240 may obtain profile information, account information, or other information from database(s) 132 to authenticate a user before executing a user request of the user. As an example, the application 240 may be part of a given service provider. As such, the application 240 may determine whether the user has access to one or more services associated with the application 240 before executing the user request on behalf of the user.

In an implementation, a given application 240 may obtain content from database(s) 132 and/or content provider(s) 160 to provide one or more results of a user request of a user. In one use case, where the user request comprises a command to play a media item (e.g., song, video clip, movie, etc.), and the application 240 comprises a media stream application, the application 240 may obtain the media item from a given content provider(s) 160 and stream the media item to output device(s) 250 for presentation to the user.

In an implementation, natural language processing engine(s) 230, application(s) 240, or other components may store information in database(s) 132 for later use by natural language processing engine(s) 230, application(s) 240, or other components. As an example, as described in further detail elsewhere herein, natural language processing engine(s) 230 may store information regarding user inputs in database(s) 132 and/or update profile information, grammar information, or other information in database(s) 132 based on the information regarding the user inputs.

Profile Management

In an implementation, stored user profile information (e.g., name, address, preferences, etc.) may be utilized to determine the adequacy of available information for responding to a user's natural language input. In one use case, for example, a user may request recommendations for nearby restaurants via a personal assistant application on a user device associated with the user. If, for instance, the user device does not currently have network access (e.g., the user device is not within its service provider's cellular network range), the personal assistant application may utilize the user device's GPS coordinates and pre-stored map data (e.g., map data obtained prior to leaving the cellular network range and stored at the user device) to obtain restaurant information and generate recommendations for the user. However, the user's profile information may indicate that the user is asking for a search of at least a 5 mile radius for restaurants (e.g., a predefined setting specifying the 5 mile radius search), and the pre-stored map data may only allow the personal assistant application to search for restaurants within a 2 mile radius of the user. As such, the personal assistant application may determine that information sufficient to provide an adequate response is not currently accessible. Although the personal assistant application may still generate a response with restaurant recommendations, it may subsequently follow-up with additional and/or updated recommendations when it is able to search for restaurants within at least a 5 mile radius of the user.

In an implementation, profile management instructions 120 may automatically set profile information such as, for example, home and/or work addresses of the user. As an example, the location of a user device of the user may be monitored to determine home and work addresses. In one use case, with user input specifying that a location corresponds to the user's home address, a particular location may be set as the user's home address based on the location being associated with a place at which the user device is located for the vast majority of time (compared to other places). Other profile information may, of course, be automatically (or manually) set, including, for example, preferred brands, preferred shopping locations, sizes, or other parameters related to products or services, entertainment interests, available devices, historical information relating to the user (e.g., school, cities lived in or visited, etc.), and/or other information relating to the user.

User Interface

In an implementation, user interface instructions 122 may generate a personal assistant interface. The personal assistant interface may provide an interface for the user to interact with system 100. For example, a user may touch/tap a prompt/button provided on the personal assistant interface to initiate interaction with the personal assistant. In an implementation, the personal assistant interface may provide a visual, audio, and/or other mode of response to a natural language query from a user. For example, the personal assistant interface may display a list of nearby preferred shopping locations, or a local map and/or directions for a requested shopping location to the user in response to a corresponding query from the user. In an implementation, the personal assistant interface may provide a visual (or other) representation of the natural language input from the user such as, for example, text transcribing the natural language input. Examples of personal assistant interfaces are illustrated with respect to FIGS. 5, 6, and 7.

In an implementation, the personal assistance interface may be associated with a personal assistant application that manages requests (e.g., queries, commands, etc.) of the user and responses to the user requests. As an example, upon determining a user request intended by a user, the personal assistant application may determine an application that is to process the user request, and provide the user request to the application. In one use case, for instance, if the user request comprises a command to play a song, the personal assistant application may provide the command to a music application. In another use case, if the user request comprises a query for weather information, the personal assistant application may provide the query to a weather application. As another example, the personal assistant application may receive results (related to a user request) from an application selected by personal assistant application to process the user request, and then generate a response to the user request for presentation to the user based on the results. In an implementation, the personal assistant application may comprise one or more of user input processing instructions 118, profile management instructions 120, user interface instructions 122, response instructions 140, or other instructions for managing user requests and/or responses to the user requests.

In an implementation, the personal assistant application may comprise an application that is independently operable of other applications that it selects to process user requests and/or from which it receives corresponding results. In one use case, for example, the personal assistant application may be an autonomous application that acts as an interface between users and subsystems (e.g., third party applications) that provide services to the users.

In an implementation, user interface instructions 122 may generate a profile information management interface. The profile information management interface may allow the user to set profile information related to the personal assistant. For example, the profile information management interface enables the user to set default locations, and/or parameters related to products or services preferred by the user. In an implementation, the profile information management interface enables the user to set preferences with respect to operations of the personal assistant, such as, for example, times when active notification is to be suspended (e.g., when in a meeting, when sleeping, etc.).

Information Retrieval

In an implementation, information retrieval instructions 142 may enable computer system 104 to retrieve information for responding to a natural language input associated with a user. For example, in one scenario, a user may ask "Who holds the current world record for the fastest marathon time?" In response, information retrieval instructions 142 may enable computer system 104 (or a personal assistant application thereof) to interface with search engine(s) 180 to retrieve information relating to the query. The retrieved information may be displayed for the user by implementing user interface instructions 122.

In an implementation, information retrieval instructions 142 may enable computer system 104 to determine adequacy of the retrieved information. For example, in the context of Jane Doe's Facebook profile being inaccessible at a given time, information retrieval instructions 142 may enable computer system 104 to determine that the information retrieved while interfacing with content provider 160 (e.g., Facebook) is null (e.g., since Facebook is inaccessible).

In an implementation, information retrieval instructions 142 may enable computer system 104 to determine that user requested information corresponds to dynamic events, activities, or statuses, and, thus, subject to change. For example, in the context of a query relating to race leaders in a Formula 1 race, information retrieval instructions 142 may enable computer system 104 to determine that a Formula 1 race is currently ongoing and that the race leaders may be different at a subsequent time.

In an implementation, information retrieval instructions 142 may enable computer system 104 to determine that providing an adequate response to a natural language input may require interfacing with search engine(s) 180, or content provider(s) 160 at a subsequent time. For example, in the context of estimated time of travel, information retrieval instructions 142 may enable computer system 104 to retrieve information regarding traffic at a time when the user is departing from his/her current location so as to provide updated information relating to the estimated time of travel.

Session Context Determination

In an implementation, session context determination instructions 144 may enable computer system 104 to determine context of an interactive session between computer system 104 and a user. For example, if a user inquires about a currently ongoing Formula 1 race, and follows up with additional inquiries relating to specific drivers or teams competing in Formula 1 races, session context determination instructions 144 may determine that the interactive session between computer system 104 and the user may be specific to Formula 1 racing. As another example, a user may provide a natural language input relating to his wife's anniversary (e.g., "Remind me to purchase a gift for my wife on January 1"), and proceeds to provide several natural language inputs relating to specific shopping locations (e.g., "How far is Tiffany's from here?"; "How long will it take to reach the nearest Macy's?"; "Which is the best bakery in my 10 mile radius?"; etc.) session context determination instructions 144 may enable computer system 104 to determine that the user is attempting to prepare for his anniversary.

In an implementation, session context determination instructions 144 may enable information retrieval instructions 142 to provide follow-up responses to prior natural language input from a user. For example, a user may provide a natural language input related to a query for Jane Doe's birthday. If the only known source of Jane Doe's birthday is Jane Doe's Facebook profile, and the Facebook profile is currently inaccessible, computer system 104 may not be able to provide a response that adequately addresses the user's query at that particular time. At a subsequent time, however, while the user is in a dialog with computer system 104 regarding Formula 1 racing, and Jane Doe's Facebook profile becomes accessible, session context determination instructions 144 may prompt information retrieval instructions 142 to search for a Formula 1 driver having the same birthday as Jane Doe. Information retrieval instructions 142 may then enable computer system 104 to interface with search engine(s) 180 or content provider(s) 160 to retrieve such information and provide it to the user in the context of the dialog relating to Formula 1 racing.

Examples of System Architectures and Configurations

Different system architectures may be used. For example, all or a portion of response instructions 140 (or other instructions described herein) may be executed on a user device. In other words, computing device 110 as illustrated may include a user device operated by the user. In implementations where all or a portion of response instructions 140 are executed on the user device, the user device may interface with search engine(s) 180, and/or content provider(s) 160 to retrieve information, determine a context of an interactive session with a user, and/or perform other functions/operations of response instructions 140.

As another example, all or a portion of response instructions 140 (or other instructions described herein) may be executed on a server device. In other words, computing device 110 as illustrated may include a server device that obtains a user input from a user device operated by the user. In implementations where all or a portion of response instructions 140 are executed on the server device, the server may interface with search engine(s) 180, and/or content provider(s) 160 to retrieve information, determine a context of an interactive session with a user, and/or perform other functions/operations of response instructions 140.

Although illustrated in FIG. 1 as a single component, computer system 104 may include a plurality of individual components (e.g., computer devices) each programmed with at least some of the functions described herein. In this manner, some components of computer system 104 may perform some functions while other components may perform other functions, as would be appreciated. Processor(s) 112 may each include one or more physical processors that are programmed by computer program instructions. The various instructions described herein are exemplary only. Other configurations and numbers of instructions may be used, so long as processor(s) 112 are programmed to perform the functions described herein.

It should be appreciated that although the various instructions are illustrated in FIG. 1 as being co-located within a single computing device 110, one or more instructions may be executed remotely from the other instructions. For example, some computing devices 110 of computer system 104 may be programmed by some instructions while other computing devices 110 may be programmed by other instructions, as would be appreciated. Furthermore, the various instructions described herein are exemplary only. Other configurations and numbers of instructions may be used, so long as processor(s) 112 are programmed to perform the functions described herein.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor(s) 112 as well as data that may be manipulated by processor(s) 112. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

User device(s) may include a device that can interact with computer system 104 through network 102. Such user device(s) may include, without limitation, a tablet computing device, a smartphone, a laptop computing device, a desktop computing device, a network-enabled appliance such as a "Smart" television, a vehicle computing device, and/or other device that may interact with computer system 104.

The various databases 132 described herein may be, include, or interface to, for example, an Oracle™ relational database sold commercially by Oracle Corporation. Other databases, such as Informix™, DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Access™, MySQL, PostgreSQL, HSpace, Apache Cassandra, MongoDB, Apache CouchDB™, or others may also be used, incorporated, or accessed. The database may comprise one or more such databases that reside in one or more physical devices and in one or more physical locations. The database may store a plurality of types of data and/or files and associated data or file descriptions, administrative information, or any other data. The database(s) 132 may be stored in storage device 114 and/or other storage that is accessible to computer system 104.

Example Flow Diagrams

The following flow diagrams describe operations that may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Figure 3:
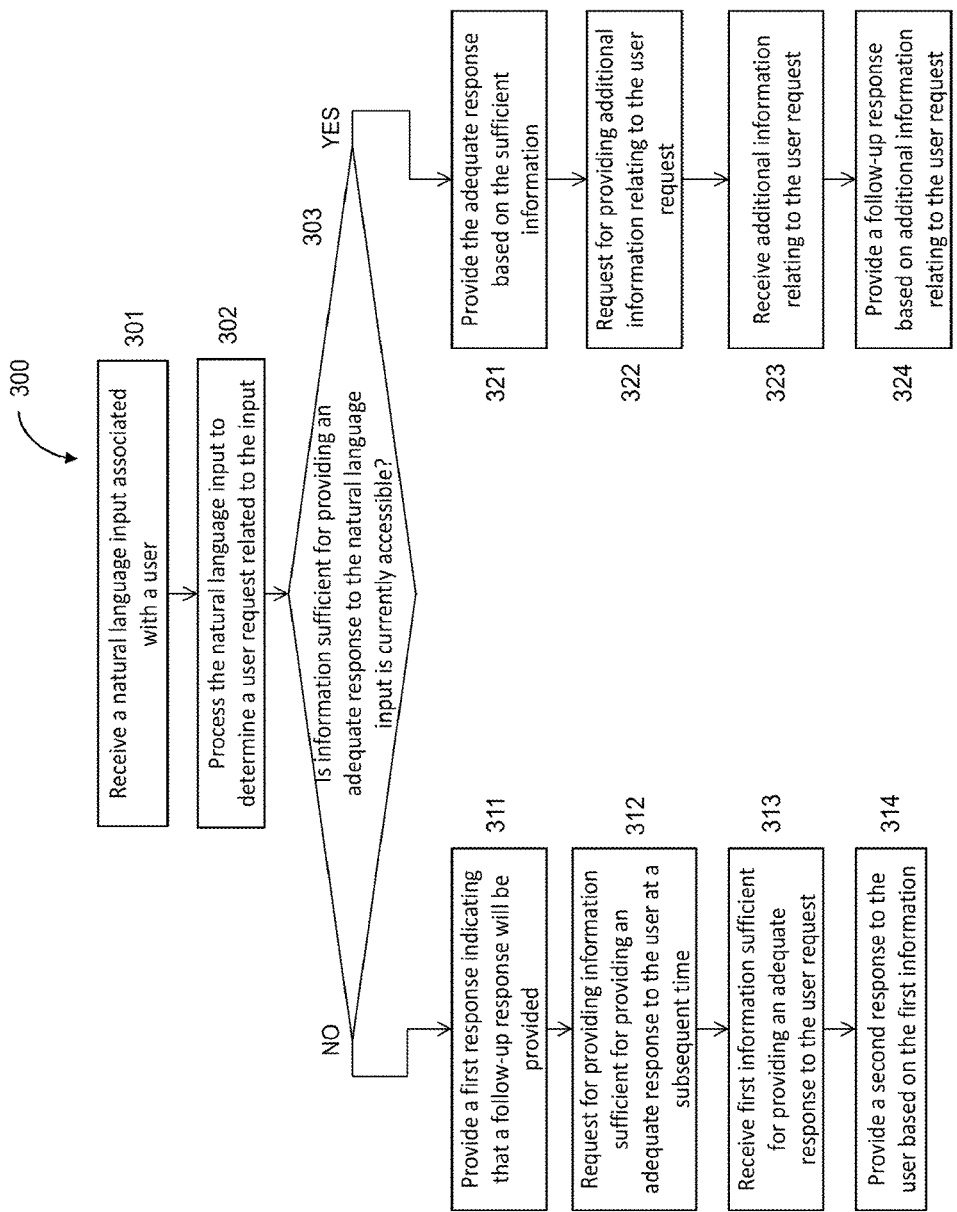
FIG. 3 illustrates a flow diagram for a method of providing follow-up responses to prior natural language inputs associated with a user, according to an implementation of the invention.

FIG. 3 illustrates a flow diagram for a method of providing follow-up responses to prior natural language inputs associated with a user, according to an implementation of the invention. The various processing data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 301, a natural language input associated with a user may be received at a user device. In an operation 302, the natural language input may be processed to determine a user request related to the natural language utterance. As an example, a user input comprising a natural language utterance may be received and processed by a speech recognition engine to recognize one or more words of the natural language utterance. The recognized words may then be processed, along with context information associated with the user, by a natural language processing engine to determine the user request related to the natural language utterance.

In an operation 303, a determination of whether information sufficient for providing an adequate response to the user request (or the natural language input) is currently accessible may be effectuated.

In an operation 311, upon determination that information sufficient for providing an adequate response to the user request of the user is currently not accessible (or not available), a first response may be provided indicating that a follow-up response will be provided. The first response may be, for example, a visual or audio output indicating that requested information is currently not accessible and that the requested information will be provided when it becomes available. In one implementation, whatever information is available may be provided to the user as part of the first response along with a message indicating that more information is forthcoming at a subsequent time as it becomes available. For example, a user may provide a query such as: "Who won today's Formula 1 race?" If the race is still ongoing (i.e., insufficient information to respond to the query), a response such as: "Today's Formula 1 race is not yet finished, results will be provided when the race is over" may be provided.

In an operation 312, more information for providing an adequate response to the user request may be requested at a subsequent time such as, for example, when a resource (e.g., a Facebook profile) becomes available or accessible. The system request for the information (for providing an adequate response) may, for example, be performed without a subsequent user request for such information after it is initially determined that such information is currently inaccessible.

In an operation 313, first information sufficient for providing adequate response to the user is received, e.g., from the newly available or accessible resource (e.g., a Facebook profile).

In an operation 314, a second response to the user request may be provided to the user based on the first information.

In an operation 321, upon determination that information sufficient for providing an adequate response is currently accessible (or available), such information may be obtained, and a response to the user request may be generated (and provided to the user) based on the obtained information. For example, when a user inquires about Jane Doe's birthday, and a database storing information regarding Jane Doe's birthday is accessible, the information may be obtained and provided to the user.

In an operation 322, additional information relating to the user request may be requested at a subsequent time. The request for additional information may, for example, be performed without a subsequent user request for the additional information.

In an operation 323, additional information relating to the user request may be received (e.g., from a search engine or a content provider). For example, in the context of Jane Doe's birthday coinciding with Nicki Lauda's birthday, this additional information may be received, for example, from a Wikipedia entry about Nicki Lauda.

In an operation 324, a second response based on the additional information relating to the user request may be provided at a subsequent time (e.g., when the user is in a dialog with the personal assistant about Formula 1 racing).

Figure 4:
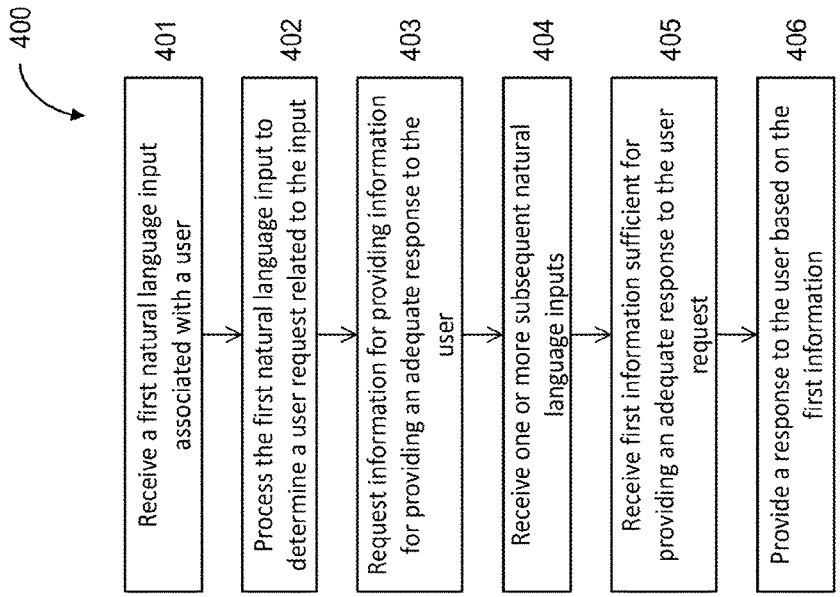
FIG. 4 illustrates another flow diagram for a method of providing follow-up responses to prior natural language inputs associated with a user, according to an implementation of the invention.

FIG. 4 illustrates another flow diagram for a method of providing follow-up responses to prior natural language inputs associated with a user, according to an implementation of the invention. In an operation 401, a natural language input of a user may be received. In an operation 402, the natural language input may be processed to determine a user request related to the natural language input. As an example, a user input comprising a natural language utterance may be received and processed by a speech recognition engine to recognize one or more words of the natural language utterance. The recognized words may then be processed, along with context information associated with the user, by a natural language processing engine to determine the user request related to the natural language utterance.

In an operation 403, information sufficient for providing an adequate response to the user request may be requested.

In an operation 404, one or more subsequent natural language inputs may be received from the user. In an implementation, the subsequent natural language inputs may be received and processed irrespective of whether information sufficient for providing an adequate response to the user request has been received (responsive to the system request for information sufficient for providing an adequate response to the user request) and/or whether a response to the user request has been provided to the user. As an example, asynchronous full-duplex communication between the user and a personal assistant application (e.g., hosted on computing system 104) may be enabled to facilitate receipt and processing of natural language inputs, and system responses to user inputs.

In an operation 405, first information sufficient for providing an adequate response to the user request may be received (e.g., after receiving the subsequent natural language inputs, after providing responses to the subsequent natural language inputs, etc.).

In an operation 406, a response to the user request may be provided based on the first information. In an implementation, the response based on the first information is provided subsequent to providing a response to the subsequent natural language inputs.

Example Screenshots

Figure 5:
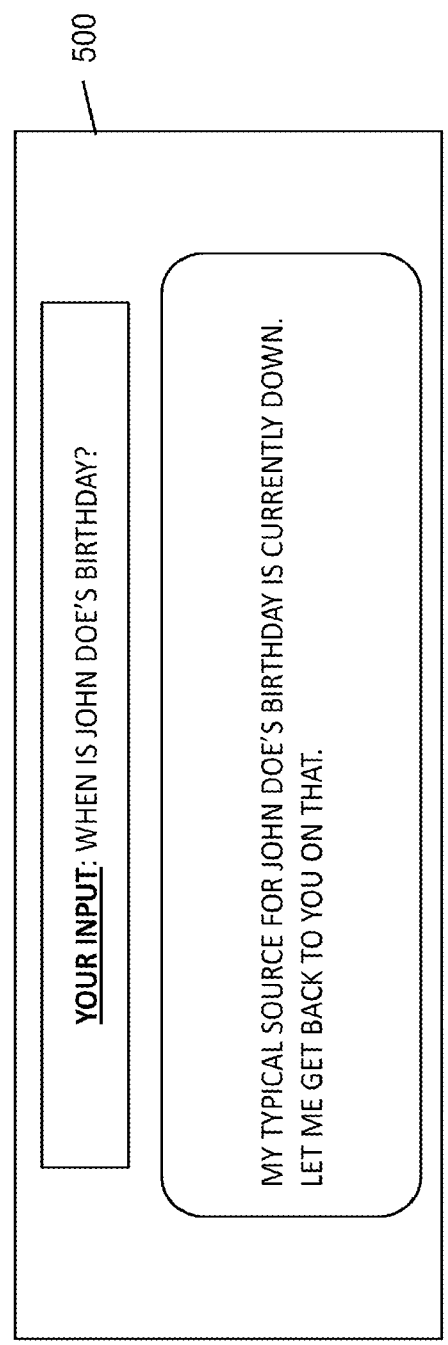
FIG. 5 illustrates a screenshot of a user interface which provides a response indicating that a follow-up response will be provided, according to an implementation of the invention.

FIG. 5 illustrates a screenshot 500 of a user interface which provides a response indicating that a follow-up response will be provided, according to an implementation of the invention. The described screenshots may be accomplished using some or all of the system components described in detail above. With respect to screenshot 500, a user may provide a natural language input (e.g., natural language utterance or other input) indicating a user request for Jane Doe's birthday. In response to the natural language input, an application associated with the depicted user interface (e.g., a personal assistant application) may provide a first response to the natural language input from the user. As an example, the first response may be indicative of insufficient information for providing an adequate response to the natural language input. If, for example, the best resource (e.g., a Facebook profile) for obtaining information for providing a response to the natural language input is inaccessible (e.g., due to resource downtime), a response indicating that sufficient information related to the user's request is not currently available, and that an adequate response will be provided when information becomes available. As depicted in screenshot 500, the response to the user request may include a reason for insufficient information and an indication that a follow-up response will be provided.

Figure 6:
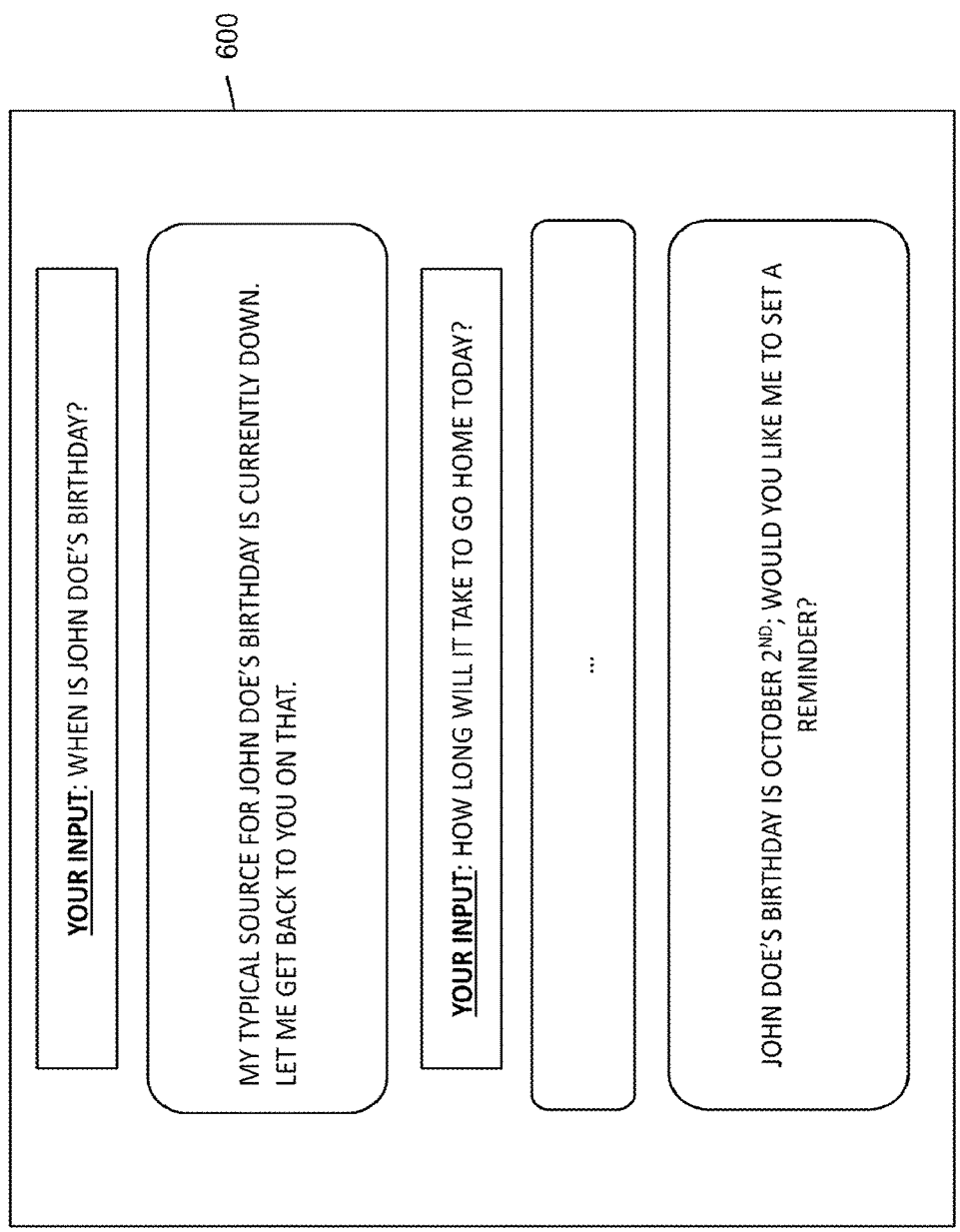
FIG. 6 illustrates a screenshot of a user interface which provides follow-up responses to prior natural language inputs associated with a user, according to an implementation of the invention.

FIG. 6 illustrates a screenshot 600 of a user interface which provides follow-up responses to prior natural language inputs associated with a user, according to an implementation of the invention. The described screenshots may be accomplished using some or all of the system components described in detail above. With respect to screenshot 600, continuing the Jane Doe birthday example in FIG. 5, a follow-up response may be provided at a later time (e.g., when an available source storing information regarding Jane Doe's birthday is found). As indicated in screenshot 600, the follow-up response (e.g., "Jane Doe's birthday is October 2. Would you like me to set a reminder?") may be provided after receiving one or more subsequent natural language inputs from the user and/or providing responses to the subsequent user inputs.

Figure 7:
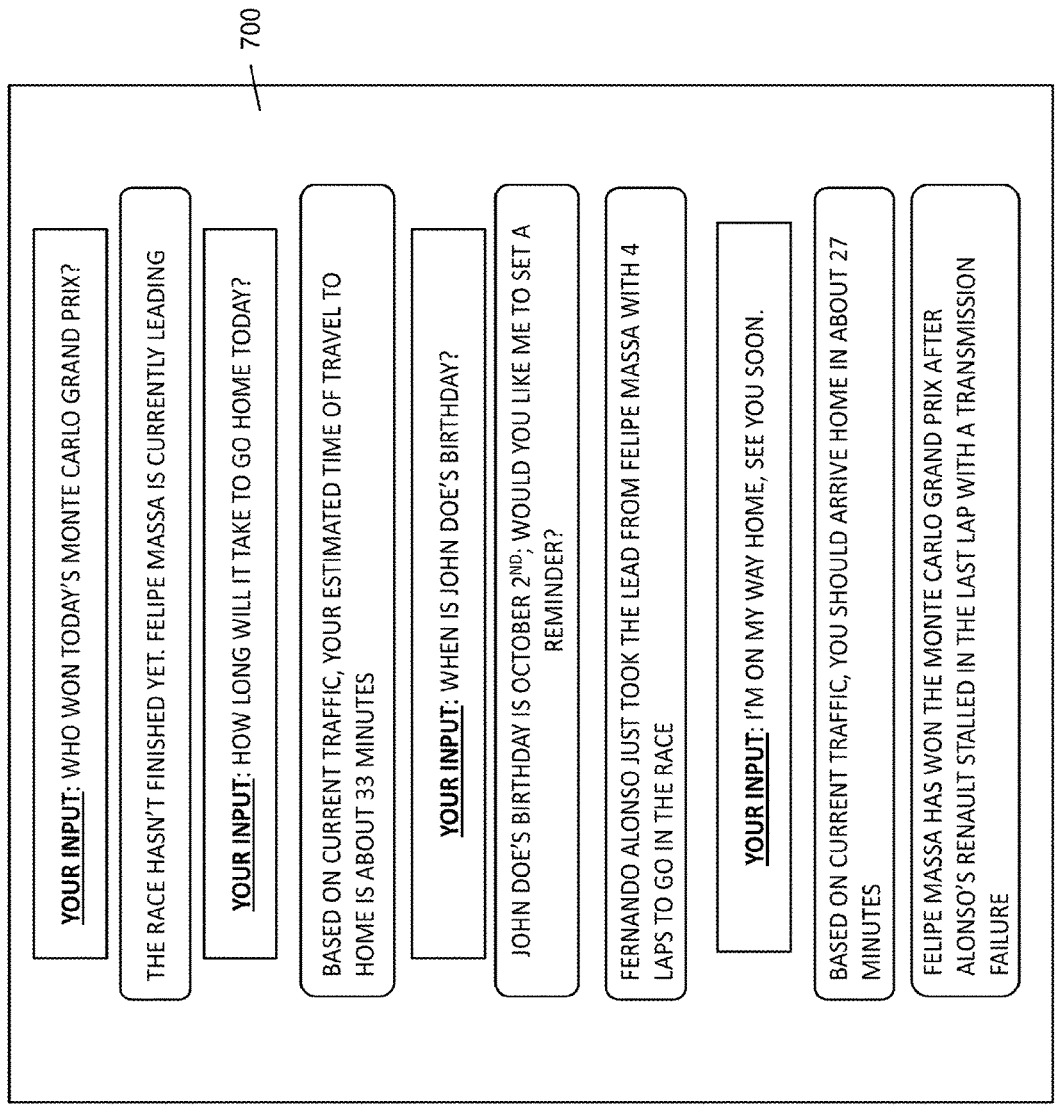
FIG. 7 illustrates a screenshot of a user interface which provides follow-up responses to prior natural language inputs associated with a user in between unrelated subsequent user inputs and/or responses to the subsequent user inputs, according to an implementation of the invention.

FIG. 7 illustrates a screenshot 700 of a user interface which provides follow-up responses to prior natural language inputs associated with a user in between unrelated subsequent user inputs and/or responses to the subsequent user inputs. The described screenshots may be accomplished using some or all of the system components described in detail above. With respect to screenshot 700, a user may interact with the system (or a personal assistant application thereof) by providing a number of natural language inputs, which results in immediate system responses that adequately addresses the inputs. In some cases, updated information relating to the user inputs may be available at a subsequent time during this interaction between the user and the system. In such cases, the updated information (e.g., driver positions in a race) may be provided (e.g., in the form of follow-up responses) in real-time to the user as it becomes available, without a prompt or subsequent related input from the user. In other cases, the updated information (e.g., current estimated time to the user's home) may be provided based on a subsequent natural language input (e.g., "I'm leaving for home") from the user.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for providing follow-up responses to prior natural language inputs of a user, the method being implemented on a computer system having one or more physical processors programmed with computer program instructions which, when executed, programs the computer system to perform the method, the method comprising:

receiving, by the computer system, a first natural language input;

determining, by the computer system, that a first response to the first natural language input is unable to be provided at a first time;

receiving, by the computer system, a second natural language input at a second time after the first time;

providing, by the computer system, a second response to the second natural language input;

obtaining, by the computer system, without a further user request to obtain a response to the first natural language input, information for responding to the first natural language input after the second response has been provided;

determining, by the computer system, a context of the second natural language input;

generating, by the computer system, the first response based on the context of the second natural language input and the information for responding to the first natural language input; and providing, by the computer system, the first response.

2. The method of claim 1, wherein the natural language input comprises a natural language utterance, the method further comprising:
   providing, by the computer system, the natural language utterance as an input to an automated speech recognition engine;
   receiving, by the computer system, as an output of the automated speech recognition engine, one or more words or phrases of the natural language utterance;
   processing, by the computer system, using a natural language processing engine, the one or more words or phrases; and
   determining, by the computer system, an intent of the natural language utterance based on the processing, wherein the first response is based on the intent of the natural language utterance.

3. The method of claim 2, wherein the intent relates to a query to be performed, and wherein determining that the first response to the first natural language input is unable to be provided at the first time comprises:
   identifying, by the computer system, a source from which a result of the query is to be obtained; and
   determining, by the computer system, that the source is unavailable.

4. The method of claim 3, wherein determining that the source is unavailable comprises:
   determining, by the computer system, that the source is not responding to the query.

5. The method of claim 3, wherein determining that the source is unavailable comprises:
   determining, by the computer system, that a network connection used to connect to the source is unavailable.

6. The method of claim 2, wherein the intent relates to a command to be executed at a device remote from the computer system, and wherein determining that the first response to the first natural language input is unable to be provided at the first time comprises:
   identifying, by the computer system, the device; and
   determining, by the computer system, that the device is unavailable.

7. The method of claim 6, wherein determining that the device is unavailable comprises:
   determining, by the computer system, that the device is not responding to the command.

8. The method of claim 6, wherein determining that the device is unavailable comprises:
   determining, by the computer system, that a network connection used to connect to the device is unavailable.

9. The method of claim 6, wherein the device comprises a thermostat device, the method further comprising:
   generating, by the computer system, the command, wherein the command comprises an instruction to adjust a temperature setting of the thermostat device.

10. The method of claim 6, wherein the device comprises a media device, the method further comprising:
    generating, by the computer system, the command, wherein the command comprises an instruction to play media.

11. The method of claim 1, the method further comprising:
    determining, by the computer system, that the natural language input includes a request for information relating to a topic;
    obtaining, by the computer system, without receiving a further user request to obtain updates relating to the topic, second information comprising an update relating to the topic; and
    providing, by the computer system, without receiving the further user request to obtain updates relating to the topic, an updated response based on the second information after the first response and the second response has been provided.

12. A system for providing follow-up responses to prior natural language inputs of a user, the system comprising:
    a computer system having one or more physical processors programmed with computer program instructions which, when executed, programs the computer system to:
    receive a first natural language input;
    determine that a first response to the first natural language input is unable to be provided at a first time;
    receive a second natural language input at a second time after the first time;
    provide a second response to the second natural language input;
    obtain, without a further user request to obtain a response to the first natural language input, information for responding to the first natural language input after the second response has been provided;
    determine a context of the second natural language input;
    generate the first response based on the context of the second natural language input and the information for responding to the first natural language input; and
    provide the first response.

13. The system of claim 12, wherein the natural language input comprises a natural language utterance, and wherein the computer system is further programmed to:
    provide the natural language utterance as an input to an automated speech recognition engine;
    receive as an output of the automated speech recognition engine, one or more words or phrases of the natural language utterance;
    process using a natural language processing engine, the one or more words or phrases; and
    determine an intent of the natural language utterance based on the processing, wherein the first response is based on the intent of the natural language utterance.

14. The system of claim 13, wherein the intent relates to a query to be performed, and wherein to determine that the first response to the first natural language input is unable to be provided at the first time, the computer system is further programmed to:
    identify a source from which a result of the query is to be obtained; and
    determine that the source is unavailable.

15. The system of claim 14, wherein to determine that the source is unavailable, the computer system is further programmed to:
    determine that the source is not responding to the query.

16. The system of claim 14, wherein to determine that the source is unavailable, the computer system is further programmed to:
    determine that a network connection used to connect to the source is unavailable.

17. The system of claim 13, wherein the intent relates to a command to be executed at a device remote from the computer system, and wherein to determine that the first response to the first natural language input is unable to be provided at the first time, the computer system is further programmed to:
    identify the device; and
    determine that the device is unavailable.

18. The system of claim 17, wherein to determine that the device is unavailable, the computer system is further programmed to:
    determine that the device is not responding to the command.

19. The system of claim 17, wherein to determine that the device is unavailable, the computer system is further programmed to:
    determine that a network connection used to connect to the device is unavailable.

20. The system of claim 17, wherein the device comprises a thermostat device, and wherein the computer system is further programmed to:
    generate the command, wherein the command comprises an instruction to adjust a temperature setting of the thermostat device.

21. The system of claim 17, wherein the device comprises a media device, and wherein the computer system is further programmed to:
    generate the command, wherein the command comprises an instruction to play media.

22. The system of claim 12, wherein the computer system is further programmed to:
    determine that the natural language input includes a request for information relating to a topic;
    obtain without receiving a further user request to obtain updates relating to the topic, second information comprising an update relating to the topic; and
    provide, without receiving the further user request to obtain updates relating to the topic, an updated response based on the second information after the first response and the second response has been provided.

* * * * *